United States Patent
Clem et al.

(10) Patent No.: US 12,417,424 B1
(45) Date of Patent: Sep. 16, 2025

(54) SYSTEMS AND METHODS FOR INTERNATIONAL SHIPPING

(71) Applicant: PSI Systems, Inc., Mountain View, CA (US)

(72) Inventors: John Roland Clem, Manhattan Beach, CA (US); Shea Robert Felix, Falls Church, VA (US)

(73) Assignee: PSI Systems, Inc., Pablo Alto, CA (US)

( * ) Notice: Subject to any disclaimer, the term of this patent is extended or adjusted under 35 U.S.C. 154(b) by 341 days.

(21) Appl. No.: 17/211,395

(22) Filed: Mar. 24, 2021

Related U.S. Application Data

(63) Continuation of application No. 15/636,427, filed on Jun. 28, 2017, now abandoned, which is a continuation-in-part of application No. 15/187,401, filed on Jun. 20, 2016, now Pat. No. 11,488,093.

(51) Int. Cl.
| | |
|---|---|
| *G06Q 10/0831* | (2023.01) |
| *G06K 15/02* | (2006.01) |
| *G06Q 10/083* | (2024.01) |
| *G06Q 20/14* | (2012.01) |
| *G06Q 20/28* | (2012.01) |

(52) U.S. Cl.
CPC ....... *G06Q 10/0831* (2013.01); *G06K 15/024* (2013.01); *G06Q 10/0838* (2013.01); *G06Q 20/14* (2013.01); *G06Q 20/28* (2013.01)

(58) Field of Classification Search
None
See application file for complete search history.

(56) References Cited

U.S. PATENT DOCUMENTS

| | | | |
|---|---|---|---|
| 5,319,562 A | 6/1994 | Whitehouse | |
| 6,005,945 A | 12/1999 | Whitehouse | |
| 8,100,324 B1 | 1/2012 | Leon | |
| 8,463,659 B2 * | 6/2013 | Shakes | G06Q 30/0601 705/26.1 |
| 10,181,110 B1 | 1/2019 | Atkinson et al. | |

(Continued)

OTHER PUBLICATIONS

Roberto Bergami, International Delivery Risks: The Case of Delivered Duty Paid in Australia, 2016, Victoria University (Year: 2016).*

(Continued)

*Primary Examiner* — Ismail A Manejwala

(57) ABSTRACT

Systems and methods providing an itinerant processing methodology wherein one or more processes, functions, etc. may be performed as an item to be shipped is transported from a shipper to an intermediary processing provider or other shipment processing point. For example, embodiments may comprise an itinerant prepay process in which international fees may be collected prior to the items entering the jurisdiction in which the international fees become due, an itinerant change process to facilitate making changes, such as to change a delivery address, add, change, or remove special service selections, and/or an itinerant business procedure process, such as a fraud detection process, during the time in which an item is transported from a shipper to a shipment processing point. Changes to the shipment, such as to cancel or abort the shipment, change a shipping service, etc., may thus be made after shipment of the item has been initiated.

22 Claims, 3 Drawing Sheets

(56) References Cited

U.S. PATENT DOCUMENTS

| | | |
|---|---|---|
| 2002/0120475 A1 | 8/2002 | Morimoto |
| 2004/0034544 A1 | 2/2004 | Fields et al. |
| 2006/0036504 A1* | 2/2006 | Allocca .................. G06Q 30/06 705/26.1 |
| 2007/0299686 A1 | 12/2007 | Hu et al. |
| 2011/0066549 A1* | 3/2011 | Whitehouse ........... G06Q 20/10 705/401 |
| 2013/0198060 A1 | 8/2013 | Whitehouse |
| 2013/0275325 A1* | 10/2013 | Shakes ............... G06Q 30/0601 705/330 |
| 2015/0166163 A1 | 6/2015 | Longson et al. |
| 2016/0098677 A1* | 4/2016 | Kim ................... G06Q 10/0833 705/333 |
| 2016/0239788 A1 | 8/2016 | Hanks |
| 2016/0328676 A1* | 11/2016 | Yeager ............... G06Q 10/0831 |
| 2017/0091320 A1 | 3/2017 | Psota et al. |

OTHER PUBLICATIONS

Unpublished U.S. Appl. No. 13/828,800 to Atkinson et al., filed Mar. 14, 2013 and entitled "System and Methods for Mail Piece Interception, Rescue Tracking, and Confiscation Alerts and Related Seivices," 63 pages.

Abramowicz, Towards a Service-Based Internet 4th European Conference, ServiceWave 2011, Poznan, Poland, Oct. 26-28, 2011, Proceedings, Springer (Year: 2011).

* cited by examiner

SYSTEMS AND METHODS FOR INTERNATIONAL SHIPPING

The present application is a continuation of U.S. patent application Ser. No. 15/636,427 entitled "SYSTEMS AND METHODS FOR INTERNATIONAL SHIPPING," filed Jun. 28, 2017, which is a continuation-in-part of co-pending, commonly assigned, patent application Ser. No. 15/187,401 entitled "MULTI-LEG INTERNATIONAL SHIPPING," filed Jun. 20, 2016, the disclosures of which are hereby incorporated herein by reference in their entirety.

TECHNICAL FIELD

The invention relates generally to shipment of items and, more particularly, to international shipment of items where duties and/or other official international fees are applicable.

BACKGROUND OF THE INVENTION

The shipment of items, such as new and used goods shipped from merchants or other shippers to purchasers or other recipients, has been commonplace for years. For example, it is commonplace for various merchants, whether they be "brick and mortar" merchants, online merchants, or sellers through an electronic marketplace (e.g., eBay, Amazon Marketplace, Shopify, etc.), to ship goods using a number of forms of shipping services and media, such as letters, flats, and parcels, via various shipping service providers, such as the United States Postal Service (USPS), United Parcel Service (UPS), Federal Express (FedEx), Dalsey, Hillblom and Lynn (DHL), and local and regional couriers.

With the advent of the Internet and the advent of innumerable e-commerce merchants and marketplaces, not only have the number of items shipped increased appreciably in recent years, but so too have the number of shippers and recipients of such items. Moreover, even small sellers and individuals are provided with a global market, thus resulting in an ever increasing number of items being shipped internationally. Accordingly, more and more shippers, including not only large scale business traditionally involved with high volume shipping but also less sophisticated smaller entities, are shipping items internationally.

International shipping can, however be problematic for the shipper and/or recipient and can present challenges often not an issue with respect to domestic shipping. For example, generally there are duties imposed on and customs processing of items entering from another country. Clearing the customs process in a destination country can often require significant time for particular items or shipments, and in many cases can result in the item being refused entry into the country. Moreover, the determination of duties and taxes for any particular destination country can be challenging, particularly in light of the large number of duty codes or categories used by many countries and the taxes often being based on the particular locality of the destination (i.e., the city or region in which the destination is located, not just the destination country). Providing for the collection of duties and taxes from recipients presents a further challenge. Often a shipper, particularly a shipper occasionally using international shipping services, does not have sufficient knowledge to confidently complete customs forms (e.g., to properly determine a goods code or category) or to determine if duties or taxes are to be paid and, if so, the amount of such duties and taxes. Accordingly, a shipper is often unable to determine an appropriate amount for the applicable duties and taxes at the time of checkout, and thus is not in a position to collect prepayment of duties and taxes from a recipient at the time of checkout. This can lead to situations where items shipped internationally become abandoned or cannot be economically returned to the shipper, such as due to their entering another country without payment of duties and taxes by a recipient and their refusal or inability to remit the required fees. An alternative is for the shipper to ship items using a postally cleared service (e.g., USPS postally cleared services), wherein duties and taxes are collected from a recipient in the form of a cash-on-delivery (COD) payment upon delivery of the item to the recipient. However, such postally cleared services are generally appreciably more costly than international shipping services where duties and taxes are handled directly (e.g., commercially cleared services).

Moreover, theft, loss, and abandonment of shipped items is a substantial risk when shipped items are carried by some shipping service providers operating within particular countries. Shippers (even relatively sophisticated shippers) often do not have information from which to determine the reliability or veracity of any particular shipping service provider operating in a foreign jurisdiction, and even if the shipper had such information the shipper is often limited in their ability to avoid using such a shipping service provider. For example, a shipper may utilize a domestic postal service (e.g., the United States Postal Service (USPS)) for international shipping, such as due to cost, availability, and/or service offerings (e.g., postally cleared service for handling duties and taxes). The domestic postal service may utilize a particular shipping service provider in the destination country (e.g., the domestic postal service of the destination country) without any choice to the shipper, and wherein the destination country shipping service provider is not wholly reliable or experiences a high loss or theft rate. Moreover, such international shipping services are generally not well suited for efficient customs processing, often leading to relatively lengthy times to clear customs as well as a significant refusal rate with respect to goods entering some countries. Accordingly, the international shipping process can be frustrating to shippers and create surprises for both the shipper and recipient in terms of the reliability of delivery of items, the ultimate total cost of goods delivered to the recipient, and the time required for delivery of goods to the recipient.

BRIEF SUMMARY OF THE INVENTION

The present invention is directed to systems and methods which facilitate international shipment of items where duties, tariffs, taxes, and/or other official fees associated with international transfer of goods (collectively referred to herein as international fees) are applicable. Embodiments of the invention provide an itinerant processing methodology wherein one or more processes, functions, etc. may be performed as an item to be shipped internationally is transported from a shipper to an international processing provider or other origination country egress processing point. For example, an itinerant processing methodology of embodiments may comprise an itinerant prepay process in which international fees associated with items being shipped internationally may be collected prior to the items entering the jurisdiction (e.g., destination country) in which the international fees become due. Further, embodiments may provide a plurality of options with respect to processes for the payment of international fees, such as to include static prepay process (e.g., prepayment of international fees prior to initiating shipment of the item) option and payment on delivery process (e.g., postally cleared service) option in addition to an itinerant prepay process option for payment of international fees.

Itinerant processing provided prior to egress from the origination country and/or ingress to the destination country by internationally shipped items may comprise processing in addition to or in the alternative to the aforementioned itinerant international fee prepay processing. For example, during the time in which an item to be shipped internationally is transported from a shipper to an international processing provider or other origination country egress processing point, embodiments of the invention provide itinerant change processing operable to facilitate a shipper and/or recipient making changes, such as to change a delivery address, add, change, or remove special service selections (e.g., insurance for one or more legs of the shipment, shipment tracking, expedited delivery, delivery notification, signature requirement, etc.). Likewise, during the time in which an item to be shipped internationally is transported from a shipper to an international processing provider or other origination country egress processing point various business procedure processes, such as one or more fraud detection process (e.g., analyzing payment data, such as records associated with a credit card used for payment, to identify a fraudulent transaction, analyzing shipment origination and/or destination information to identify historical fraud, etc.), may be performed. Changes to the international shipment, such as to cancel or abort the international shipment (e.g., the item may be returned to the shipper prior to egress from an origin country and/or ingress into a destination country), may be made after shipment of the item has been initiated.

In operation according to embodiments, an item to be shipped internationally is not withheld from initiating shipment of the item, although one or more process for which itinerant processing is to be performed has not been initiated and/or completed. For example, shipment of an item from a shipper location may be initiated where prepayment of international fees is to be collected despite payment for the international fees associated with the international shipment not having been made (e.g., itinerant prepay processing may be performed prior to the items entering the destination country to facilitate return of the item and avoid its abandonment). Similarly, shipment of an item from a shipper location may be initiated despite one or more business procedure process, such as fraud analysis, not having been completed (e.g., itinerant business procedure processes may be performed prior to the items exiting the origination country to facilitate termination of international shipping and return of the item). Accordingly, international shipment of items according to embodiments may invoke multiple shipment legs (e.g., comprising an ingestion leg, a bridge leg, and a delivery leg) to provide a robust international shipment architecture adapted for efficient and reliable international shipping of item. As an item to be shipped internationally is transported from a shipper to an international processing provider or other origination country egress processing point, such as during an ingestion leg and/or a bridge leg (or some portion thereof) of an international shipment, (referred to herein as pre-origination country egress shipment) embodiments of the invention operate to perform itinerant processing, such as to facilitate collection of appropriate international fees for the item (e.g., calculating applicable international fees, communicating with the recipient for eliciting international fee payment, initiating an international fee payment transaction with the recipient, etc.) from a recipient.

In operation according to embodiments, various actions may be taken based upon the itinerant processing implemented with respect to an international shipment. For example, where payment of the international fees is timely collected from the recipient (e.g., during pre-origination country egress shipment, such as during an ingestion leg, prior to a bridge leg, prior to completion of a bridge leg, prior to shipment involving international border crossing, prior to release for shipment into a jurisdiction in which international fees become due, etc.) in an itinerant prepay process of embodiments, the item may be provided international processing (e.g., customs processing, international fee settlement using a commercially cleared service, etc.) and international border passage (e.g., international transportation, customs logistics, etc.) by the international processing provider in the bridge leg of the international shipment and the item may proceed to a delivery leg of the international shipment. Where, however, payment of the international fees is not timely collected from the recipient in an itinerant prepay process of embodiments, other action may be taken with respect to the shipment. For example, international shipment of the item (e.g., origination country egress shipment) may be declined (e.g., the item may be returned to the shipper for want of international fee payment). Embodiments of the invention may, however, provide for operation to facilitate the international shipment, such as by implementing a convertible itinerant prepay process in which collection of the international fees is converted from prepayment processing to an alternative form of international fee processing (e.g., static prepay where further shipping of the item is withheld until prepayment of international fees is made, payment on delivery where COD payment of international fees is made upon delivery of the item to the recipient using a postally cleared service is implemented, etc.).

In a delivery leg of the international shipment of embodiments, the item is transported from the international processing provider or other ingress processing point in the destination country to the recipient. The delivery leg services may differ depending upon the methodology by which international fees are/will be paid. For example, where international fee payment has been made through itinerant prepay operation, the item may be commercially cleared through customs and a variety of destination country domestic delivery services (e.g., inexpensive delivery services, expedited delivery services, etc.) may be available for use in the delivery leg of the international shipment of the item. However, where international fee payment has been converted from an itinerant prepay process to a payment on delivery process due to the failure of prepayment for international fees, fewer destination country domestic delivery services may be available in order to enable clearance through customs (e.g., using a postally cleared service to obtain customs clearance, wherein the postal service provider dictates the destination country domestic delivery services). Moreover, the costs for customs processing and/or destination country delivery services may be appreciably higher using the options enabling payment of international fees on delivery of the item to the recipient.

In operation of a multiple leg international shipment of embodiments, the particular shipping service providers providing the ingestion leg and delivery leg shipping services may each be individually selected, such as for the individual international shipment to provide lowest or most desired rates, to provide one or more special services or handling, to facilitate a desired delivery timeline, to meet a desired or threshold level of reliability or veracity with respect to the particular services, etc. Embodiments may, for example, utilize domestic shipping services of one or more shipping service providers (e.g., a domestic postal service, such as USPS, a local courier service, a domestic (or domestic branch of) parcel service, a less than a truckload (LTL) service, etc.) within an origination country for an ingestion leg and within a destination country for a delivery leg of an international shipment. A particular shipping service provider and/or the particular shipping service to be provided by the shipping service provider may be selected for meeting one or more needs or desires with respect to the individual international shipment. It should be appreciated that a particular shipping service provider and/or the particular shipping service to be provided by the shipping service provider initially selected with respect to a delivery leg of an international shipment may be changed in operation of a convertible itinerant prepay process, such as when payment of the international fees is not collected from the recipient during pre-origination country egress shipment.

In addition to or in the alternative to the particular shipping service providers providing the ingestion leg and delivery leg shipping services being individually selected, embodiments of a multiple leg international shipment herein may operate to select a particular international processing provider and/or particular international processing provider facility for use with respect to individual international shipments. For example, a particular international processing provider may be selected for the international shipment of an item based upon their serving the destination country, accommodating itinerant processing (e.g., itinerant international fee prepayment processing, itinerant business processing, etc.), providing customs clearance processing or other international processing services with respect to particular type of goods included in the shipped item, providing selected or desired services (e.g., commercially cleared service such as a delivered duties paid (DDP) service, expedited international processing services, etc.), one or more characteristic of the shipper (e.g., the sophistication of the shipper with respect to international shipping, the amount of international shipment items shipped by the shipper, etc.), one or more characteristic of the recipient (e.g., the sophistication of the recipient with respect to international shipping, the amount of international shipment items received by the shipper, etc.), and/or the like. Additionally or alternatively, a particular international processing provider facility may be selected for the international shipment of an item based upon the facility's proximity to the shipper, the recipient, the origination country, and/or the destination country, the facility's capability for handling a particular type of goods included in the shipped item, and/or the like. An item shipped in accordance with a multiple leg international shipment of embodiments may thus be routed to a particular international processing provider facility location corresponding to a selected international processing provider and/or international processing provider facility.

It should be appreciated that an international processing provider facility selected with respect to an item for which itinerant international fee prepayment is implemented may provide operation in accordance with itinerant processing of embodiments. For example, systems of the international processing provider facility may monitor for collection of the appropriate international fees and may allow international processing (e.g., customs processing, international fee settlement using a commercially cleared service, etc.) and international border passage (e.g., international transportation, customs logistics, etc.) by the international processing provider where payment of the international fees is timely collected from the recipient in an itinerant prepay process. Systems of the international processing provider facility may prevent international processing and international border passage by the international processing provider where payment of the international fees is not timely collected from the recipient in an itinerant prepay process, such as by causing the item to be returned to the shipper for want of international fee payment. Additionally or alternatively, systems of the international processing provider facility may provide operation to facilitate the international shipment by implementing a convertible itinerant prepay process in which collection of the international fees is converted from prepayment processing to static prepay or payment on delivery, for example.

In facilitating the use of individually selected shipping service providers for various legs of an international shipment architecture, individually selected international processing provider, and/or individually selected international processing provider facility, embodiments utilize multiple shipping labels for a shipped item. For example, a first shipping label may be utilized for the ingestion leg to route the item from the shipper to the international processing provider or other origination country egress processing point and a second shipping label may be utilized for the delivery leg to route the item from the international processing provider or other ingress point in the destination country to the recipient. Yet another shipping label may be utilized in the bridge leg to route the item for international border passage. For example, a shipping label may be utilized with respect to a plurality of international shipment items (e.g., as may be aggregated in a bag, box, or other container by the international processing provider) for transport between the origination country and destination country. The appropriate shipping label for the selected shipping service provider, shipping service, shipping route, etc. may be generated and/or printed for use in the corresponding leg of the multiple leg international shipment.

Embodiments utilizing domestic shipping services with respect to the ingestion leg and/or the delivery leg and the aforementioned multiple shipping labels utilize a domestic shipping label configuration for the item with respect to the domestic shipping service, whereby the domestic shipping label does not include international shipment information (e.g., package contents information, customs information, declared value information, international destination information, and/or the like). For example, where a domestic shipping service is utilized in the destination country for the delivery leg, the shipping label present on the item for that leg of the multiple leg international shipment may comprise recipient address information and domestic address information (e.g., international processing provider or other ingress processing point address, domestic return agent address, etc.) for a return shipping address, without international customs information. Accordingly, where package theft may be a concern, items shipped using a multiple leg international shipment in accordance to the concepts herein may have information regarding it being an international shipment and information disclosing the contents or value of the item obfuscated. Embodiments of the invention may utilize a return address indicating the shipper of the item on a shipping label utilized with respect to the ingestion leg and/or delivery leg, such as to facilitate the shipping service provider providing return of the item to the shipper in the case of the item being undeliverable (e.g., due to an incorrect address, the recipient refusing or failing to pay international fees on delivery, etc.). For example, in operation of a convertible itinerant prepay process, a shipping label utilized for a postally cleared service (e.g., as may also be utilized for delivery services provided in the delivery leg) may be provided that includes the address of the shipper as the return address to facilitate return of the item to the shipper if it is undeliverable.

Although customs information or other international shipment information may not be included on one or more label utilized for a particular leg of a multiple leg international shipment, embodiments nevertheless operate to collect such information and provide for customs clearance and other international processing for the item. For example, embodiments may operate to include a shipping label with respect to the shipped item or a plurality of international shipment items for transport between the origination country and destination country that includes customs information and/or other international shipment information to facilitate appropriate international processing of the item(s). Additionally or alternatively, international processing information, such as customs, international fee information, is provided in a destination country prior to the arrival of items shipped internationally in a multiple leg international shipment of embodiments herein. For example, such international processing information may be transmitted electronically to the international processing provider or other ingress processing point in the destination country for initiation of international processing of the shipment prior to arrival of the corresponding item(s) in the destination country, such as to expedite international shipment processing when the item arrives in the destination or to otherwise reduce the timeline for ultimate delivery of the item to the recipient.

Moreover, international processing of the item may be performed by the international processing provider of embodiments prior to the item leaving the origination country (or otherwise prior to the item entering the destination country), such as at the international processing provider facility or other origination country egress processing point in the origination country. For example, items may be inspected for proper customs goods code or category assignment, conformance to importation restrictions of the destination country, international fee settlement, etc. to facilitate expedited international shipment processing in the destination country and/or to avoid situations in which an item is refused in the destination country and must be returned to the origination country.

International shipment processing of the item performed by the international processing provider of embodiments may comprise aggregating a plurality of items from individual international shipments (e.g., in a bag, box, or other container). Such aggregation may not only be used for convenient transport of the items between the origination country and destination country, but also to facilitate international shipment processing in the destination country. For example, such aggregation of international shipment items may be utilized to enable commercial customs clearance of the items in the destination country. One or more label, manifest, declarations form, and/or other international shipment documentation may be generated by the international processing provider in association with the aggregated international shipment items for use in international shipment processing in the destination country. Such international shipment documentation may be attached to or included with the aggregated items (e.g., attached to a bag, box, or other container incarcerating the items) and/or transmitted electronically to the destination country for use in international shipment processing of the items in the destination country.

As can be appreciated from the foregoing, international shipment processing provided by an international processing provider of embodiments herein may include generation of various documentation and/or information in association with an item. In operation of some embodiments utilizing multiple shipping labels for a shipped item, the international processing provider may generate a shipping label for use in the delivery leg of the multiple leg international shipment. For example, a shipping label used in the ingestion leg of the multiple leg international shipment to route the item to the international processing provider may be replaced by the international processing provider with a shipping label to be used in the delivery leg of the multiple leg international shipment to route the item to the recipient.

To facilitate providing transparency with respect to the progress and status of a multiple leg international shipment item, embodiments herein provide for unified tracking information for the multiple shipment legs. For example, a unified tracking number for the multiple leg international shipment may be linked to one or more tracking numbers for the individual shipment legs. It should be appreciated, however, that tracking information provided in association with tracking numbers for the individual shipment legs may be inaccurate with respect to the multiple leg international shipment. For example, tracking information provided in association with a tracking number for an ingestion leg of a multiple leg international shipment may report the item has having been delivered when the item reaches the international processing provider. Although such information may be accurate in the context of the ingestion leg, it is inaccurate in the context of the multiple leg international shipment and thus may be confusing or otherwise undesirable to provide to a shipper or recipient. Accordingly, embodiments herein operate to manipulate tracking information provided in association with tracking numbers for the individual shipment legs to present unified tracking information that is accurate and otherwise appropriate to the multiple leg international shipment.

Embodiments operate to collect customs information or other international shipment information from a shipment initiation transaction (e.g., ecommerce purchase transaction, online marketplace sales transaction, online auction transaction, etc.) to facilitate international shipment processing. For example, information regarding a purchased or product to be shipped as part of the international shipped item may be collected from one or more systems used in the transaction. This information may be utilized to determine customs information (e.g., a goods code or category), to determine if international fees are to be paid and, if so, the amount of such international fees, etc. Embodiments may additionally or alternatively operate to provide international shipment processing with respect to a shipment initiation transaction. For example, an amount of international fees to be paid with respect to the international shipment may be determined and payment therefore collected in association with the shipment initiation transaction (e.g., by adding an international fee entry into an ecommerce shopping cart in association with an international shipping option in a purchase transaction, initiating a separate user interface to perform an international fee payment transaction in association with an international shipping transaction, etc.). Embodiments operate to determine an amount of international fees to be paid with respect to the international shipment and/or to solicit payment therefore during pre-origination country egress shipment (e.g., during transit of items in an ingestion leg shipment, during processing of items in a bridge leg, etc.). Payment for the international fees may thus be collected prior to customs processing.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
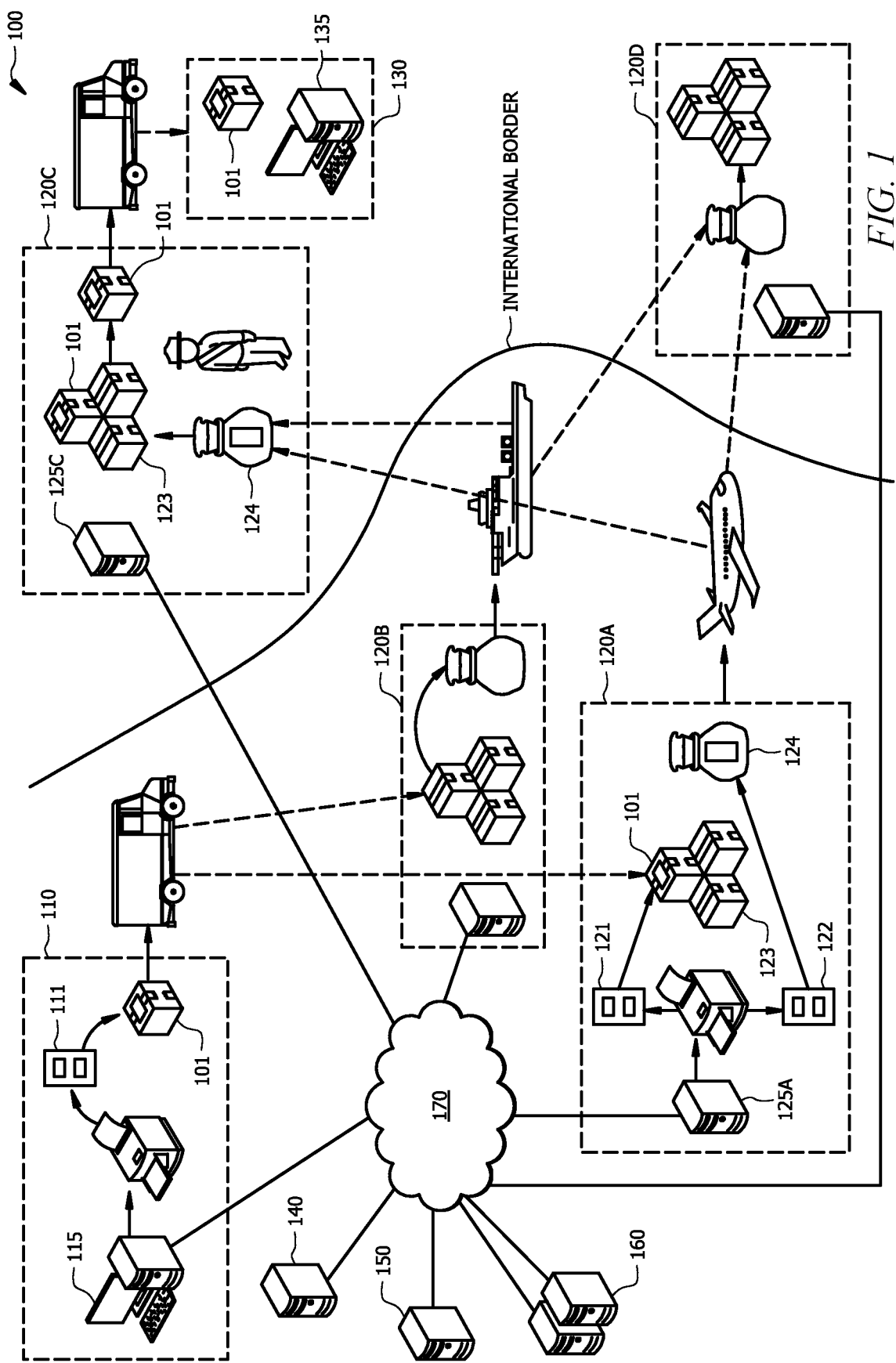
FIG. 1 shows an embodiment of a multiple leg international shipment system of embodiments of the present invention.

A system adapted in accordance with an international shipment architecture to invoke multiple shipment legs to provide international shipping of items implementing itinerant prepay methodologies facilitating prepayment of international fees (i.e., duties, tariffs, taxes, and/or other official fees associated with international transfer of goods) according to embodiments herein is shown in FIG. 1. Embodiments of multiple leg international shipment system 100 of FIG. 1 are adapted to facilitate configuration of aspects of one or more of the multiple shipment legs for particular shipments, shippers, recipients, origination countries, and/or destination countries. In operation according to embodiments, multiple leg international shipment system 100 may implement convertible itinerate prepay operation, such as to convert itinerate prepay operation to an alternative form of international fee processing, such as static prepay or payment on delivery when payment of international fees is not made by a recipient during pre-origination country egress shipment.

The embodiment of multiple leg international shipment system 100 illustrated in FIG. 1 includes a plurality of systems operable cooperatively to collect international shipping information and/or other information with respect to an item to be shipped and to operate to facilitate implementing itinerant prepay methodologies facilitating prepayment of international fees with respect to multiple leg international shipments. Accordingly, multiple leg international shipment system 100 of the illustrated embodiment includes shipper computer system 115, international processing provider computer systems 125a and 125c, recipient computer system 135, sales transaction computer system 140, international shipment computer system 150, and additional services computer systems 160 in communication via network 170. Each of shipper computer system 115, international processing provider computer systems 125a and 125c, recipient computer system 135, sales transaction computer system 140, international shipment computer system 150, and additional services computer systems 160 may comprise one or more processor-based system (e.g., a computer based on the Intel CORE family of processors) having computer readable memory (e.g., random access memory (RAM), read only memory (ROM), hard disk drive memory, solid state disk drive memory, flash memory, etc.) operable to store and execute one or more instruction set (e.g., operating system, application program, applet, user interface, etc.) providing functionality as described herein and having suitable infrastructure and/or peripheral devices (e.g., network interface card (NIC), display device, keyboard, digital pointer, printer, audio output device, wireless communications interface, etc.) to support the described functionality. Although embodiments of shipper computer system 115, international processing provider computer systems 125a and 125c, recipient computer system 135, sales transaction computer system 140, international shipment computer system 150, and additional services computer systems 160 are described with reference to their being computer systems, the concepts of the present invention are not limited to such embodiments. For example, one or more of the foregoing processor-based systems (e.g., shipper computer system 115 and/or recipient computer system 135) may comprise a portable computing device, a tablet device, a smartphone, a personal digital assistant (PDA), a processor-based kiosk system, and/or the like.

Network 170 may comprise one or more networks providing data communication between any or all of shipper computer system 115, international processing provider computer systems 125a and 125c, recipient computer system 135, sales transaction computer system 140, international shipment computer system 150, and additional services computer systems 160. For example, network 170 may comprise a local area network (LAN), a metropolitan area network (MAN), a wide area network (WAN), a wireless LAN, a cellular network, a cable transmission system, the public switched telephone network (PSTN), the Internet, an extranet, an intranet, and/or the like.

In operation according to embodiments of multiple leg international shipment system 100, item 101 (i.e., the item to be shipped internationally, as may contain various goods or other articles) may be transported from a shipper (e.g., at shipper location 110) to an international processing provider or other origination country egress processing point (e.g., at international processing provider facility location 120a or 120b) in an ingestion leg of an international shipment. Thereafter, item 101 may be provided international processing, such as may include international border passage, including international transportation and/or customs logistics, provided by the international processing provider in a bridge leg of the international shipment. Such international processing provided by the international processing provider in a bridge leg of the international shipment may additionally or alternatively include customs processing, international fee settlement, and/or the like. Item 101 of the illustrated embodiment may be transported from an international processing provider facility or other origination country egress processing point (e.g., international processing provider facility location 120a or 120b) to an international processing provider facility or other ingress processing point in the destination country (e.g., international processing provider facility location 120c or 120d) for further international processing, such as for customs clearance, etc., in the destination country. Item 101 may then be transported from the international processing provider or other ingress processing point in the destination country (e.g., international processing provider facility location 120c or 120d) to the recipient (e.g., at recipient location 130).

It should be appreciated that, although a single shipper location and a single recipient location are shown in the embodiment illustrated in FIG. 1 for simplicity, multiple leg international shipment system 100 of embodiments may serve any number of shipper locations and/or recipient locations, whether associated with the same shipper/recipient and/or different shippers/recipients. Similarly, although two international processing provider locations are shown in the origination country and in the destination country for simplicity, multiple leg international shipment system 100 of embodiments may accommodate any number of origination country international processing provider locations and/or destination country international processing provider locations, whether associated with the same international processing provider, different international processing providers, the same origination country, different origination countries, the same destination country, and/or different destination countries. Likewise, although the illustrated configuration of the international processing provider locations shows a single bridge leg of the multiple leg international shipment, it should be appreciated that multiple bridge legs may be utilized in an international shipment according to embodiments. For example, a particular international processing provider may utilize a plurality of locations in one or more countries (e.g., including one or more intermediary country that is neither the country of egress nor the country of ingress, including a plurality of locations within a same country, etc.) with respect to an international shipment. Additionally or alternatively, a plurality of international processing providers (e.g., an international processing provider providing services with respect to an origination country (country of initial egress) and an international processing provider providing services with respect to a destination country (country of final ingress)) may be utilized for an international shipment, whereby multiple bridge legs are implemented (e.g., a bridge leg linking the origination country to a particular intermediary country in which both international processing providers have an international processing provider location, and a bridge leg linking the intermediary country to the destination country).

As an example of a situation in which international shipping of an item may be provided by a multiple leg international shipment system of embodiments of the present invention, a shipper may be a seller of one or more items, such as through an ecommerce interface, an online marketplace, an online auction platform, etc. Accordingly, the seller may have used a processor-based system (e.g., shipper computer system 115) to input information about the item (e.g., a description, a general category or classification of the goods, price information, weight information, size information, etc.) into one or more processor-based systems facilitating sales transactions (e.g., sales transaction computer system 140), such as may comprise an ecommerce server, an online marketplace server, an online auction server, etc. Additionally or alternatively, information regarding the item, such as description, category, weight, size, etc., may be obtained from one or more other systems, such as a manufacturer's system or product database system provided by one or more of additional services computer systems 160. The recipient may have used a processor-based system (e.g., recipient computer system 135) to select one or more goods for purchase, to request international shipping, and to enter payment and/or other information (e.g., destination address information, special handling instructions, select shipping services, etc.). One or more other systems, such as a payment processing system, shipping service provider system, shipping rate database system, etc., of additional services computer systems 160 may be utilized in processing the foregoing transaction. It should be appreciated that sales transaction computer system 140 and/or international shipment computer system 150 may additionally or alternatively operate to determine rates for multiple leg international shipment services provided using multiple leg international shipment system 100, such as for calculating shipping charges to be charged to the recipient and/or seller in, or in association with, the foregoing transaction.

In facilitating multiple leg international shipment of items, embodiments operate to collect information regarding the international shipment of the item. Embodiments operate to collect customs information or other international shipment information for use in international shipment processing and/or to otherwise facilitate performance of one or more legs of the multiple shipment legs. A shipper (e.g., using shipper computer system 115) and/or recipient (e.g., using recipient computer system 135) may interact with international shipment computer system 150 to provide information regarding the item to be shipped, the contents of the item, the shipper's address, the recipient's address, the shipping services desired, special handling instructions, etc. Some or all such information may be provided directly by the shipper and/or recipient, such as through interaction with an international shipping user interface of international shipment computer system 150, or may be provided to international shipment computer system 150 indirectly, such as through collecting information from a shipment initiation transaction (e.g., ecommerce purchase transaction, online marketplace sales transaction, online auction transaction, etc.) performed using sales transaction computer system 140. For example, information regarding a purchased product or product to be shipped as part of the international shipped item may be collected from one or more systems (e.g., shipper computer system 115, recipient computer system 135, and/or sales transaction computer system 140) used in the transaction (e.g., from a listing for the goods purchased and to be shipped internationally).

The international shipment information and/or other information related to the item to be shipped may be utilized to determine customs information, to determine if international fees are to be paid and, if so, the amount of such international fees, etc. For example, logic of embodiments of international shipment computer system 150 may utilize information describing a product included in the item to be shipped, information regarding a sales or listing category of the product included in the item to be shipped, etc. to determine a customs goods code or category for the item to be shipped internationally. In operation according to embodiments, international shipment computer system 150 may utilize a look up table (LUT) or other data matrix to correlate descriptions of goods or other information describing goods (e.g., generic listing or sales categories for goods) to customs goods codes utilized by one or more jurisdictions (e.g., the destination country). Such a LUT or other data matrix may thus provide customs goods codes for use with international shipments associated with a plurality of different marketplaces (e.g., eBay, Amazon Marketplace, Shopify, etc.) and/or for use with international shipment of a wide variety of items shipped by a wide variety of shippers.

Additionally or alternatively, logic of embodiments of international shipment computer system 150 may operate to provide international shipment processing with respect to a shipment initiation transaction for an item to be shipped. For example, an amount of international fees to be paid with respect to the international shipment may be determined by logic of international shipment computer system 150. In operation according to embodiments, logic of international shipment computer system 150 may make a coarse determination regarding the applicable customs code for goods in the item to be shipped (e.g., resolving the customs code to 6 of 10 digits), such as using the aforementioned information and data matrix, in order to provide a real-time estimate for international fees to be paid. Similarly, logic of international shipment computer system 150 may utilize information regarding the destination address (e.g., resolving the destination address to a city code identifier (ID), such as may correspond to particular regions, such as defined by state or similar governed region, postal code or other predefined zone, and/or city or other populace area) to provide a real-time estimate for taxes to be paid. For example, a city code ID, perhaps with other information such as a description of goods, category of goods, category of recipient, etc., may be utilized with a LUT or other data matrix to estimate the applicable taxes in the destination country.

It should be appreciated that, using any or all of the aforementioned information and/or calculations (e.g., international fee estimates, and/or international shipping service rates) logic of international shipment computer system 150 may provide for interaction with the shipper and/or recipient during the shipment initiation transaction (e.g., sales transaction for goods to be shipped internationally) to collect payment for the international shipping services, the estimated international fees, perhaps including a surcharge for the prepaid international fee service and/or to accommodate instances where the estimated amount is lower than the actual amount demanded by the destination country authorities. For example, international shipment computer system 150 may interface with sales transaction computer system 140 to add international shipping and/or international fee entries into an ecommerce shopping cart in association with an international shipping option in a purchase transaction. Alternatively, international shipment computer system 150 may utilize a user interface to interface with a shipper and/or recipient (e.g., using shipper computer system 115 and/or recipient computer system 135) to perform an international shipping and/or international fee payment transaction for an item to be shipped (e.g., in association with an international shipping transaction). For example, as an item is transported from a shipper to an international processing provider or other origination country egress processing point during pre-origination country egress shipment (e.g., during an ingestion leg and/or a bridge leg, or some portion thereof, of an international shipment), international shipment computer system 150 may operate to facilitate collection of appropriate international fees for the item (e.g., calculating applicable international fees, communicating with the recipient for eliciting international fee payment, initiating an international fee payment transaction with the recipient, etc.) from a recipient. The above embodiments may, for example, facilitate a commercially cleared service such as for delivered duties paid (DDP) with respect to item 101.

In operation of multiple leg international shipment system 100 of embodiments, the particular shipping service providers providing the ingestion leg and delivery leg shipping services may each be individually selected, such as by logic of international shipment computer system 150 in accordance with the concepts herein. For example, international shipment computer system 150 may operate to select shipping service providers providing the ingestion leg and/or delivery leg shipping services for the individual international shipment based upon a shipping service provider providing lowest or most desired rates, providing one or more special services or handling, able to facilitate a desired delivery timeline, able to meet a desired or threshold level of reliability or veracity with respect to the particular services, etc. International shipment computer system 150 of embodiments may operate to alter an initial selection, or to initially make a selection, of a particular shipping service provider and/or the particular shipping service to be provided by the shipping service provider with respect to a delivery leg of an international shipment based at least in part on whether payment of the international fees is collected from the recipient during pre-origination country egress shipment. Embodiments may, for example, be adapted to utilize variety of domestic shipping services of a plurality of shipping service providers (e.g., a domestic postal service, such as USPS, a local courier service, a domestic (or domestic branch of) parcel service, a less than a truckload (LTL) service, etc.) within an origination country for an ingestion leg and within a destination country for a delivery leg of an international shipment. Accordingly, a particular shipping service provider and/or the particular shipping service to be provided by the shipping service provider may be selected for meeting one or more needs or desires with respect to the individual international shipment, for providing customs processing, international fee settlement using a commercially cleared service, payment on delivery using a postally cleared service, etc.

In operation according to embodiments, shipper computer system 115, sales transaction computer system 140, and/or international shipment computer system 150 cooperate during a shipment initiation transaction (e.g., ecommerce purchase transaction, online marketplace sales transaction, online auction transaction, etc.) to collect international shipment information, whereby international shipment computer system 150 may analyze the international shipment information, or some portion thereof, to select a particular shipping service provider and/or particular shipping service for an ingestion leg of a multiple leg international shipment and/or to select a particular shipping service provider and/or particular shipping service for a delivery leg of the multiple leg international shipment. For example, logic of international shipment computer system 150 may analyze shipper information, such as shipper address, shipper country, shipper type (e.g., high volume shipper, low volume shipper, sophisticated international shipper, unsophisticated international shipper, company, individual, etc.), shipper history, etc., recipient information, such as recipient address, recipient country, recipient type (e.g., high volume recipient, low volume recipient, sophisticated international recipient, unsophisticated international recipient, company, individual, etc.), recipient history, etc., shipping services information, such as shipping services requested, special handling instructions, shipment stream ingestion characteristics (e.g., an item of a bulk item shipment, a single item shipment, delivery by shipper to shipping service provider depot, pickup at a shipper location, loading dock pickup, non-loading dock pickup, etc.), shipment stream termination characteristics (e.g., an item of a bulk item delivery, a single item delivery, recipient will call at a shipping service provider depot, delivery to a recipient location, loading dock delivery, non-loading dock delivery, etc.), preferences regarding shipping service providers, etc., item information, such as item physical attributes (e.g., size, weight, unusual or non-standard dimension(s), etc.), special handling requirements (e.g., hazardous materials, perishable materials, fragile contents, live animal/organism, etc.), and/or the like. Using such information, logic of international shipment computer system 150 may determine a best or otherwise suitable shipping service provider in the origination country to provide shipping services for the ingestion leg of a multiple leg international shipment and/or a best or otherwise suitable shipping service provider in the destination country to provide shipping services for the delivery leg of the multiple leg international shipment.

It should be appreciated that, although some overlapping international shipment information may be utilized in the selection of a shipping service provider in the origination country and in the selection of a shipping service provider in the destination country, embodiments may make each shipping service provider determination for a multiple leg international shipment separately. Accordingly, a shipping service provider for each of the ingestion and delivery legs may be independently determined to be most appropriate for achieving the multiple leg international shipment. Embodiments may, however, make correlated selections of shipping service providers for a multiple leg international shipment, such as to achieve volume discounts using the services of a particular shipping service provider, to facilitate uniform handling of the item, to accommodate shipper/recipient preferences, etc.

In addition to or in the alternative to operation to provide selection of the particular shipping service providers providing the ingestion leg and/or delivery leg shipping services, embodiments of multiple leg international shipment system 100 operates to select a particular international processing provider and/or particular international processing provider facility for a bridge leg of the multiple leg international shipment. In operation according to embodiments, international processing provider provides services for facilitating the international border passage of the item. Accordingly, an international processing provider utilized according to embodiments may perform origination country egress processing of items at one or more facility disposed in the origination country and/or destination country ingress processing of items at one or more facility disposed in the destination country. Such egress and ingress processing may include processing to avoid refusal of items within the destination country, processing for customs clearance, processing to collect and/or remit international fees, and/or the like, as discussed in further detail below. A particular international processing provider may have a plurality of facilities within a particular origination and/or destination country (e.g., at different geographic locations), some or all of which may provide different services, handling for different items, have different international transportation options, etc. For example, international processing provider facility locations 120*a* and 120*b* and/or international processing provider facility locations 120*c* and 120*d* may be operated by a same international processing provider. Additionally or alternatively, a plurality of international processing providers may have one or more facilities within a particular origination and/or destination country (e.g., at different geographic locations), some or all of which may provide different services, handling for different items, have different international transportation options, etc. For example, international processing provider facility locations 120*a* and 120*b* and/or international processing provider facility locations 120*c* and 120*d* may be operated by different international processing providers.

In operation according to embodiments, logic of international shipment computer system 150 selects a particular international processing provider and/or a particular international processing provider facility for the international shipment of an item. For example, international shipment computer system 150 may analyze the international shipment information, or some portion thereof, to select a particular international processing provider and/or particular international processing provider facility for a multiple leg international shipment. Selection of the particular international processing provider may, for example, be based upon the international processing provider serving the origination and/or destination country, providing processing accommodating itinerant international fee prepayment, providing customs clearance processing or other international processing services with respect to particular type of goods included in the shipped item, providing selected or desired services (e.g., commercially cleared services such as a DDP service, expedited international processing services, etc.), one or more characteristic of the shipper (e.g., the sophistication of the shipper with respect to international shipping, the amount of international shipment items shipped by the shipper, etc.), one or more characteristic of the recipient (e.g., the sophistication of the recipient with respect to international shipping, the amount of international shipment items received by the shipper, etc.), one or more characteristic of the shipping service provider used in the ingestion leg and/or delivery leg (e.g., ability to accept shipment from shipping service provider, provide shipments to shipping service provider, existing cooperative data and/or logistics infrastructure, etc.), and/or the like. Additionally or alternatively, selection of the particular international processing provider facility may, for example, be based upon the international processing provider facility's proximity to the shipper, the recipient, the origination country, and/or the destination country, the international processing provider facility's capability for handling a particular type of goods included in the shipped item, one or more characteristic of the shipping service provider used in the ingestion leg and/or delivery leg (e.g., physical infrastructure for accepting shipment from shipping service provider, providing shipments to shipping service provider, proximity to shipping service provider facilities, etc.), and/or the like. It should be appreciated that the international processing provider facility in the origination country and the international processing provider facility in the destination country may be associated with a same or different international processing provider according to embodiments herein.

As can be appreciated from the foregoing, an item shipped in accordance with a multiple leg international shipment of embodiments may thus be routed from a shipper location or other shipment stream ingestion point to a recipient location or other shipment stream termination point via one or more international processing provider facility location corresponding to a selected international processing provider and/or international processing provider facility. Accordingly, embodiments utilize multiple shipping labels for an item shipped using a multiple leg international shipment. For example, shipping label 111 may be utilized for the ingestion leg to route the item from shipper location 110 to a selected international processing provider and/or a selected international processing provider facility in the origination country (e.g., international processing provider location 120*a*). Additionally, shipping label 121 may be utilized for the delivery leg to route the item from a selected international processing provider and/or a selected international processing provider facility in the destination country (e.g., international processing provider location 120*c*) to the recipient location (e.g., recipient location 130).

It should be appreciated that there may not be a one-to-one correspondence between shipping labels 111 utilized for the ingestion leg and shipping labels 121 utilized for the delivery leg of international shipments of embodiments. For example, a shipper making a number of international shipments may include a plurality of items being shipped internationally (whether directed to a same recipient or different recipients, whether directed to the same destination country or different destination countries, etc.) in a same bag, box, or other container using a single shipping label 111 where the international shipping for each such item is to be handled by a same international processing provider and international processing provider facility, such as to reduce shipping costs, to more efficiently handle and transport the items, etc. Additionally or alternatively, an international processing provider handling a number of international shipments directed to a same recipient may include a plurality of items (whether from a same shipper or different shippers, whether processed at a same international processing provider facility in the origination country of different international processing provider facilities in the origination country, etc.) in a same bag, box, or other container using a single shipping label 121.

In operation according to embodiments, a shipping label and/or other documentation that is different than the aforementioned ingestion leg and/or delivery leg shipping labels is utilized in the bridge leg of a multiple leg international shipment to route the item for international border passage. For example, international documentation 122 may comprise a shipping label utilized with respect to a plurality of international shipment items (e.g., aggregated items 123 in container 124, such as may comprise a plurality of items being provided international transportation in a same bag, box, or other container) for transport between the origination country and destination country. In the illustrated embodiment, container 124 containing item 101 and other items shipped in a multiple leg international shipment are transported between an international processing provider facility in the origination country (e.g., international processing provider location 120*a*) to an international processing provider facility in the destination country (e.g., international processing provider location 120*c*) via various means (e.g., commercial carriers, private charters, air, land, sea, etc.), wherein a shipping label of international documentation 122 may be utilized in facilitating the international transport of the items and/or the international processing (e.g., customs processing, international fee settlement, etc.) of the items. It should be appreciated, however, that international documentation 122 may additionally or alternatively comprise one or more documents not considered shipping labels. For example, international documentation 122 of embodiments may comprise bills of lading, manifests, customs forms, tax forms, packing slips, and/or the like, such as may be utilized for international processing of the items in the origination country and/or the destination country.

Shipping label 111 used in the ingestion leg of a multiple leg international shipment, providing the appropriate shipping label for routing item 101 to a selected international processing provider using a shipping service provider selected for the origination country, may be generated and/or printed by or on behalf of the shipper (e.g., using shipper computer system 115 at shipper location 110). Shipping label 121 used in the delivery leg of a multiple leg international shipment, providing the appropriate shipping label for routing item 101 from an international processing provider to the recipient using a shipping service provider selected for the destination country, may similarly be generated and/or printed by or on behalf of the shipper. However, embodiments of the invention operate to apply shipping label 121 used in the delivery leg of a multiple leg international shipment after completion of an ingestion leg of the multiple leg international shipment is complete (e.g., after arrival of item 101 at an international processing provider facility). Accordingly, embodiments may generate and/or print shipping label 121 used in the delivery leg at a location other than the shipper location (e.g., using international processing provider computer system 125*a* at international processing provider location 120*a*) to replace shipping label 111 for use in the delivery leg of the multiple leg international shipment. It should be appreciated that generation and/or printing of a shipping label according to embodiments may utilize one or more system of additional services computer systems 160, such as a shipping service provider system for obtaining tracking number information, shipping label formatting and/or content information, etc., a postage indicia service provider system for obtaining a prepaid value indicia (e.g., postage meter stamp) for including on the shipping label, and/or the like.

The aforementioned international shipment information and/or other information related to the item to be shipped may, for example, be utilized by international processing provider computer system 125*a* and/or international shipment computer system 150 to generate and/or print shipping label 121 at international processing provider location 120*a* in the origination country for routing item 101 from the international processing provider to the recipient using a shipping service provider selected for the destination country. Alternatively, the international shipment information and/or other information related to the item to be shipped may, for example, be utilized by international processing provider computer system 125*c* and/or international shipment computer system 150 to generate and/or print shipping label 121 at international processing provider location 120*c* in the destination country for routing item 101 from the international processing provider to the recipient using a shipping service provider selected for the destination country. International processing provider computer system 125*a* and/or international shipment computer system 150 of embodiments generate and/or print international documentation 122 used in the bridge leg of a multiple leg international shipment, such as using the aforementioned international shipment information and/or other information related to the item to be shipped.

It should be appreciated that a particular shipping service provider and/or the particular shipping service to be provided by the shipping service provider with respect to a delivery leg of an international shipment may be selected or reselected (e.g., changed from an initial selection) in operation of a convertible itinerant prepay process, such as when payment of the international fees is not collected from the recipient during pre-origination country egress shipment. Accordingly, shipping label 121 and/or international documentation 122 generated and/or printed at international processing provider location 120*a* in the origination country may include various changes and/or information based upon results of itinerant prepay processing performed during pre-origination country egress shipment. For example, a particular shipping service provider and/or the particular shipping service to be provided by the shipping service provider initially selected with respect to a delivery leg of an international shipment may be changed in operation of a convertible itinerant prepay process, such as when payment of the international fees is not collected from the recipient during pre-origination country egress shipment. Information within shipping label 121 and/or international documentation 122 may thus be changed or otherwise provided for routing item 101 from the international processing provider to the recipient using a shipping service provider selected for the destination country that provides an alternative form of international fee processing (e.g., payment on delivery where COD payment of international fees is made upon delivery of the item to the recipient using a postally cleared service is implemented) to facilitate the international shipment. Moreover, the itinerant processing provided during pre-origination country egress shipment with respect to items may comprise processing in addition to or in the alternative to the aforementioned itinerant international fee prepay processing. Accordingly, information within shipping label 121 and/or international documentation 122, such as a delivery address, special service selections (e.g., insurance for one or more legs of the shipment, shipment tracking, expedited delivery, delivery notification, signature requirement, etc.), return address, etc. may be changed, added, and/or revised according to embodiments of the invention.

Embodiments of multiple leg international shipment system 100 utilize domestic shipping services with respect to the ingestion leg and/or the delivery leg. Accordingly, the aforementioned multiple shipping labels may utilize a domestic shipping label configuration for shipping label 111 utilized for the ingestion leg of the multiple leg international shipment and/or for shipping label 121 utilized for the delivery leg of the multiple leg international shipment. In operation according to embodiments, such a domestic shipping label configuration does not include international shipment information (e.g., package contents information, customs information, declared value information, international destination information, and/or the like). For example, where a domestic shipping service is utilized in the destination country for the delivery leg, shipping label 121 may comprise recipient address information and domestic address information (e.g., international processing provider or other ingress processing point address, domestic return agent address, etc.) for a return shipping address, without international customs information (e.g., shipping labels utilized with respect to the ingestion leg and delivery leg of embodiments of a multiple leg international shipment may comprise standard domestic shipping label formats and associated information as generally accepted by the respective shipping service providers). Accordingly, where package theft may be a concern, items shipped using a multiple leg international shipment in accordance to the concepts herein may have information regarding it being an international shipment and information disclosing the contents or value of the item obfuscated on one or more shipping labels utilized in providing the multiple leg international shipment.

It should be appreciated that, although embodiments may utilize one or more shipping label conforming to a shipping service provider standardized format and content, embodiments may additionally or alternatively include information or other features unique to the multiple leg international shipment. For example, although not including customs information or other international shipment information, embodiments of an ingestion leg and/or delivery leg shipping label may include unified tracking information (as described further below) and/or other information used with respect to the multiple leg international shipment.

Although customs information or other international shipment information may not be included on one or more label utilized for a particular leg of a multiple leg international shipment, embodiments nevertheless operate to collect such information and provide for customs clearance and other international processing for the item. For example, an international processing provider selected for use with respect to the multiple leg international shipment preferably not only facilitates international border passage (e.g., international transportation, logistics, etc.), but also facilitates international processing (e.g., customs processing, international fee settlement, etc.). Accordingly, international shipment computer system 150 may provide international shipment information, including information regarding customs, international fees, etc., to one or more of international processing provider computer systems 125a and 125c, for use in facilitating customs clearance and other international processing for the item. International documentation 122 of embodiments may, for example, be generated and/or printed to include customs information and/or other international shipment information to facilitate appropriate international processing of the item(s).

In operation of multiple leg international shipment system 100 of embodiments, international processing information, such as customs, international fee information, is provided in a destination country prior to the arrival of items shipped internationally in a multiple leg international shipment of embodiments herein. For example, such international processing information may be transmitted electronically by international shipment computer system 150 and/or international processing provider computer system 125a to international processing provider computer system 125b at the international processing provider facility or other ingress processing point in the destination country for initiation of international processing of the shipment prior to arrival of the corresponding item(s) (e.g., aggregated items 123 including item 101) in the destination country. The international processing provider may utilize this information to expedite international shipment processing when the items arrive in the destination or to otherwise reduce the timeline for ultimate delivery of items to recipients.

Additionally or alternatively, international processing of the item may be performed by the international processing provider of embodiments prior to the item leaving the origination country (or otherwise prior to the item entering the destination country). For example, an international processing provider selected with respect to a multiple international shipment may inspect goods within item 101 at international processing provider location 120a for proper customs goods code or category assignment, conformance to importation restrictions of the destination country, international fee settlement, etc. to facilitate expedited international shipment processing in the destination country and/or to avoid situations in which item 101 is refused in the destination country and must be returned to the origination country.

To facilitate providing transparency with respect to the progress and status of item 101 during the multiple leg international shipment, embodiments of multiple let international shipment system 100 provide for unified tracking information for the multiple shipment legs. For example, logic of international shipment computer system 150 operates to provide a unified tracking number for the multiple leg international shipment. In operation according to embodiments, international shipment computer system 150 may generate a unified tracking number or other identifier for the multiple leg international shipment of item 101 and provide that tracking number to the shipper and/or recipient (e.g., via shipper computer system 115 and/or recipient computer system 135). When a tracking number for the ingestion leg of the multiple leg international shipment is assigned or available by the shipping service provider selected for this leg of the international shipment (e.g., upon generation of shipping label 111), this shipping leg tracking number is associated with the unified tracking number (e.g., in a database maintained by international shipment computer system 150) according to embodiments. Likewise, when a tracking number for the delivery leg of the multiple leg international shipment is assigned or available by the shipping service provider selected for this leg of the international shipment (e.g., upon generation of shipping label 121), this shipping leg tracking number is also associated with the unified tracking number according to embodiments. Where the bridge leg of the multiple leg international shipment has one or more tracking numbers associated therewith, such as when assigned by the international processing agent, a commercial carrier providing international transportation of the item, etc., these shipping leg tracking numbers are also associated with the unified tracking number according to embodiments. It should be appreciated that, in operation according to embodiments, a unified tracking number or other identifier for the multiple leg international shipment transparently accommodates various changes (e.g., changes regarding a particular shipping service provider and/or the particular shipping service to be provided by the shipping service provider with respect to a delivery leg of an international shipment) as may be made with respect to an international shipment according to embodiments of itinerant processing herein.

In operation according to embodiments, tracking information provided in association with the individual legs of the multiple leg international shipment is utilized in reporting tracking status with respect to the item. Accordingly, a shipper, recipient, or other individual may utilize a unified tracking number to access tracking information associated with various legs of the multiple leg international shipment. Tracking information provided in association with tracking numbers for the individual shipment legs may, however, be inaccurate with respect to the multiple leg international shipment. For example, tracking information provided in association with a tracking number for an ingestion leg of a multiple leg international shipment may report the item has having been delivered when item 101 reaches international processing provider location 120a. Although such information may be accurate in the context of the ingestion leg, it is inaccurate in the context of the multiple leg international shipment and thus may be confusing or otherwise undesirable to provide to a shipper or recipient. Accordingly, logic of international shipment computer system 150 of embodiments operates to manipulate tracking information provided in association with tracking numbers for the individual shipment legs to present unified tracking information that is accurate and otherwise appropriate to the multiple leg international shipment. For example, tracking information provided in association with an ingestion leg of the multiple leg international shipment indicating a "delivered" status may be manipulated to reflect "accepted for international processing" or other status more appropriate to the multiple leg international shipment.

It should be appreciated that the bridge leg of a multiple leg international shipment may not have a tracking number associated therewith. For example, the international processing provider may utilize bulk, chartered, or other shipping means wherein tracking numbers or other traditional shipment tracking information is not provided. In operation according to embodiments of the invention, data regarding the status of shipment of an item is nevertheless obtained from the international processing provider for use in reporting tracking type information for an item using a unified tracking number. For example, personnel of international processing provider may input information regarding the departure, transit, and/or arrival of container 124, containing item 101, into international processing provider computer system 120a and/or 120c during the bridge leg of the multiple leg international shipment. Item 101 may be associated with container 124 in one or more database of multiple leg international shipment system 100 (e.g., a database of international processing provider computer system 120a and/or 120c, a database of international shipment computer system 150, etc.), whereby this information may be used to associate the information regarding the status of container 124 with that of item 101. Thus, reporting of the tracking status of item 101 may be provided, perhaps using the aforementioned operation to manipulate the information to present unified tracking information that is accurate and otherwise appropriate to the multiple leg international shipment, throughout the bridge leg of embodiments of a multiple leg international shipment even where traditional tracking information for this leg is not available.

It should be appreciated that any or all of shipper computer system 115, international processing provider computer systems 125a and 125c, recipient computer system 135, sales transaction computer system 140, international shipment computer system 150, and additional services computer systems 160 may cooperate or otherwise operate to provide functionality ancillary to the international shipment of items. For example, one or more such systems may operate to process payment and/or settlements in association with various aspects of the services provided (e.g., to provide payment to one or more shipping service provider in association with ingestion leg and/or delivery leg shipment services, one or more international processing provider in association with international processing and/or bridge leg shipment services, one or more agency of the origination and/or destination countries in association with international fees, etc.). Additionally or alternatively, one or more such systems may operate to process collection and/or payment in association with various aspects of the services provided (e.g., to collect payment from a shipper and/or recipient for shipping services, etc.).

Figure 2:
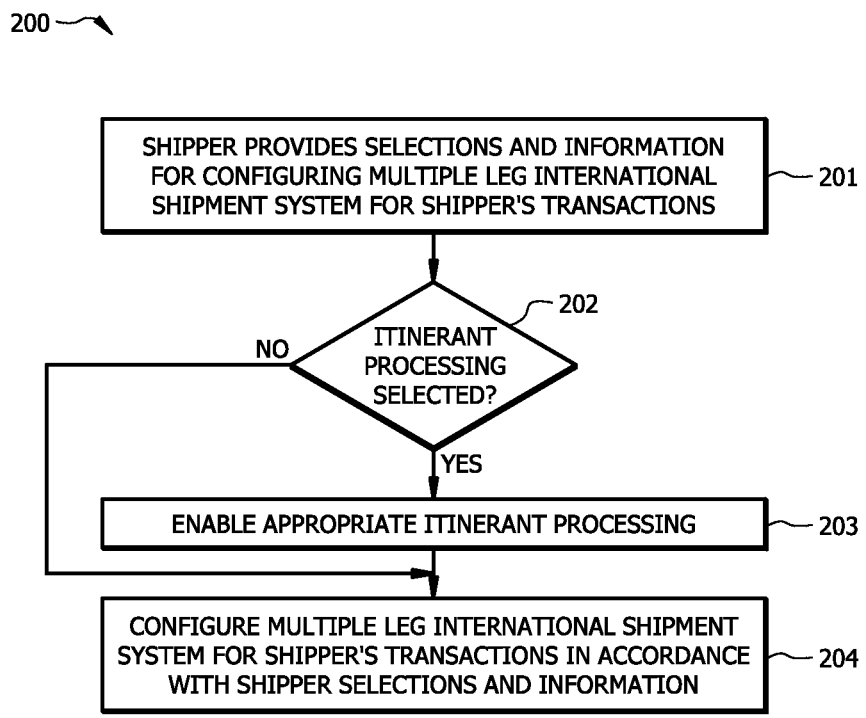
FIG. 2 shows a flow diagram of operation to configure a multiple leg international shipment system for operation in accordance with embodiments of the present invention.
Figure 3:
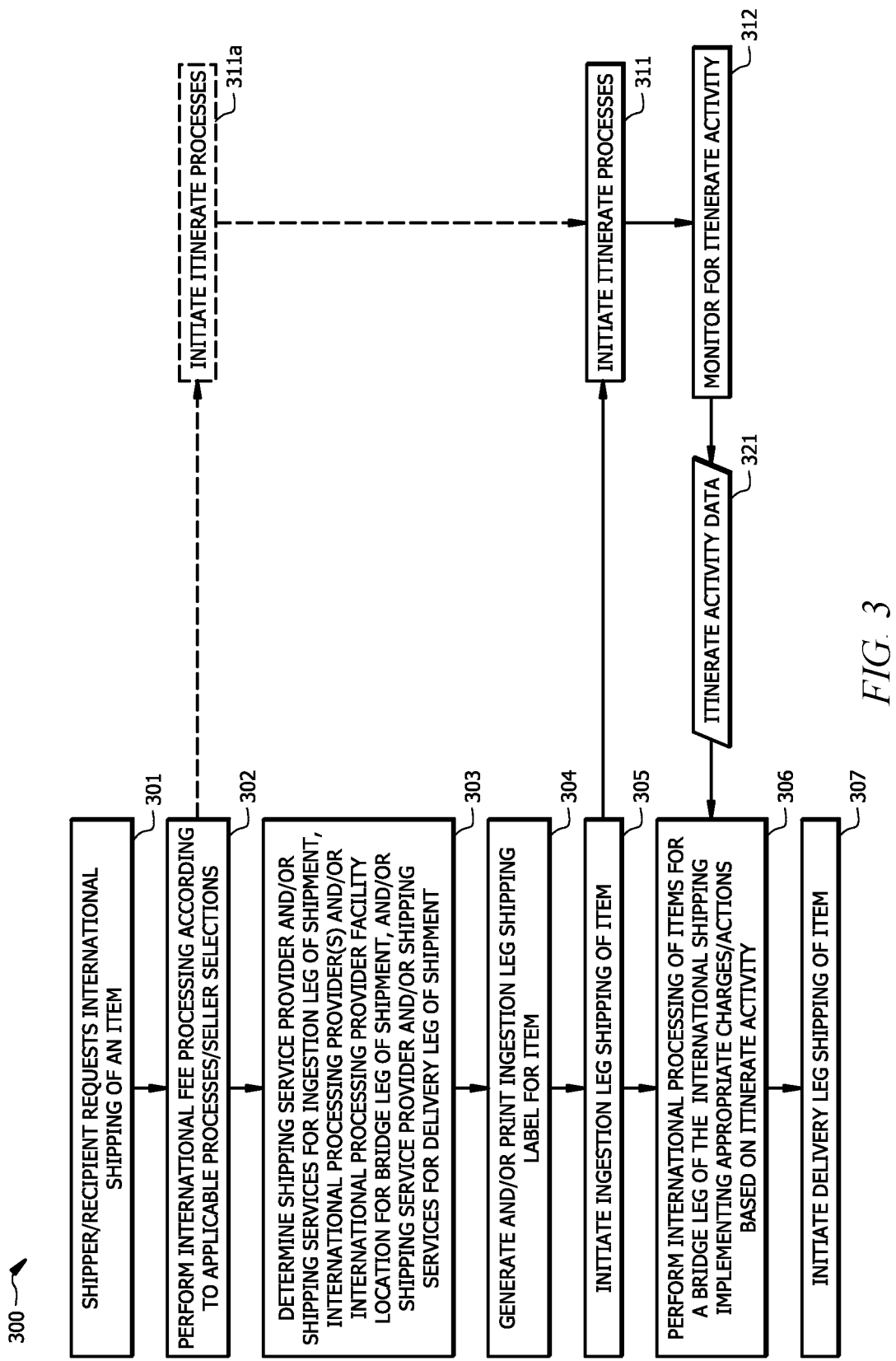
FIG. 3 shows a flow diagram of operation of a multiple leg international shipment system in accordance with embodiments of the present invention.

Having described embodiments of multiple leg international shipment system 100 above, exemplary operation of multiple leg international shipment system 100 in accordance with concepts herein is described with reference to the flow diagrams of FIGS. 2 and 3. In particular, flow 200 of FIG. 2 illustrates exemplary operation of multiple leg international shipment system 100 for configuration with respect to a shipper's international shipping transactions, such as may include configuration for implementing itinerant processing according to embodiments herein. Flow 300 of FIG. 3 illustrates exemplary operation of multiple leg international shipment system 100, including implementing itinerant processing, in association with a multiple leg international shipment according to embodiments herein.

Operation of multiple leg international shipment system 100 according flow 200 of the embodiment illustrated in FIG. 2 includes a shipper providing selections and information for configuring the multiple leg international shipment system for the shipper's international shipping transactions at block 201. For example, personnel of a shipper may utilize shipper computer system 115 to interface with international shipment computer system 150 and input various selections and information useful for configuring multiple leg international shipment system 100 to provide operation consistent with the shipper's desired international shipment processes. The selections and information provided by a shipper at block 201 of embodiments may include, for example, selections and/or information regarding shipping service providers, shipping services, international processing providers, shipper locations, international processing provider facility locations, authorized users, access credentials, system access information, etc. to facilitate providing multiple leg international shipment of items for the shipper's international shipping transactions.

Embodiments of multiple leg international shipment system 100 are configured to provide itinerant processing functionality operable while an item to be shipped internationally is transported from a shipper to an international processing provider or other origination country egress processing point (e.g., during pre-origination country egress shipment). Accordingly, the selections and information provided by a shipper at block 201 of embodiments may include selection of one or more itinerant processing methodology for implementation by multiple leg international shipment system 100. For example, a shipper may provide information indicating a general election to have itinerant processing implemented with respect to the shipper's international shipping transactions. Additionally or alternatively, a shipper may provide information indicating election of one or more itinerant process, such as to enable an itinerant prepay process in which international fees associated with items being shipped internationally may be collected prior to the items entering the destination country, an itinerant change process facilitating changes with respect to international shipments by shippers and/or recipients, itinerant business procedure processes facilitating performance of various business processes (e.g., fraud detection) while items are transported from a shipper to an international processing provider or other origination country egress processing point, such as during an ingestion leg and/or a bridge leg (or some portion thereof) of an international shipment.

The information regarding itinerant process provided by a shipper at block 201 of embodiments may comprise information in addition to information to selecting one or more itinerant process for implementing by multiple leg international shipment system 100. For example, information with respect to preferences, options, etc. for selected itinerant processes may be provided. As a specific example, an itinerant prepay process may optionally be configured as a convertible itinerant prepay process in which collection of the international fees is converted from prepayment processing to an alternative form of international fee processing (e.g., static prepay where further shipping of the item is withheld until prepayment of international fees is made, payment on delivery where COD payment of international fees is made upon delivery of the item to the recipient using a postally cleared service is implemented, etc.) when prepayment is not timely made. Accordingly, a shipper may provide information for selecting such optional implementation of the itinerant process at block 201.

Information regarding selections made by a shipper for configuring the multiple leg international shipment system for the shipper's international shipping transactions at block 201 may include selections in addition to or in the alternative to one or more itinerant process. For example, embodiments of multiple leg international shipment system 100 may be configured to provide a plurality of options with respect to methodologies for the payment of international fees, such as to include one or more static prepay process (e.g., prepayment of international fees prior to initiating shipment of the item) options and one or more payment on delivery process (e.g., postally cleared service) options in addition to itinerant prepay process options for payment of international fees. Accordingly, a shipper may provide information for selecting such optional international fee payment methodologies at block 201 of embodiments.

It should be appreciated that various of the selections and/or information provided by a shipper for configuring the multiple leg international shipment system for the shipper's international shipping transactions at block 201 may be applicable to all or subsets of the shipper's shipping transactions. For example, one or more itinerant process selected by the shipper may be selected for implementation with respect to one or more subset of shipping transactions (e.g., international shipments with respect to particular recipients, particular classes or categories of recipients, particular destination countries or geographic areas, particular items or classes of items, transactions involving a minimum or maximum threshold value, particular origination country or geographic area, etc.). Accordingly, a shipper may provide information for implementing one or more selection with respect to subsets of the shipper's shipping transactions at block 201.

At block 202 of the illustrated embodiment of flow 200, a determination is made as to whether the shipper selected itinerant processing (e.g., any or all of itinerant change processing, itinerant prepay processing, itinerant business procedure processing, etc.) be implemented with respect to the with respect to the shipper's international shipping transactions. For example, logic of international shipment computer system 150 may analyze the selections and/or information provided by a shipper at block 201 to determine if itinerant processing has been selected for implementation by the shipper. If it is determined that itinerant processing has not been selected, processing according to the illustrated embodiment proceeds to block 204 for configuring one or more system of multiple leg international shipment system 100 for operation without implementing itinerant processing for the shipper's shipping transactions. However, if it is determined that itinerant processing has been selected, processing according to the illustrated embodiment proceeds to block 203 for operation to enable appropriate itinerant processing with respect to the shipper's shipping transactions.

Processing to enable itinerant processing with respect to the shipper's shipping transactions provided at block 203 of embodiments of flow 200 may include various operations for facilitating appropriate itinerant processing for the shipping transactions. For example, logic of international shipment computer system 150 may analyze selections and/or information regarding configuring multiple leg international shipment system 100 for itinerant processing provided by the shipper to determine particular systems, service providers, services, etc. suitable for facilitating one or more functions of itinerant processing selected by the shipper. Similarly, logic of international shipment computer system 150 may analyze the selections and/or information provided by the shipper to determine subsets of shipping transactions to which one or more itinerant process is to apply for enabling itinerant processing appropriate to the shipper's selections.

At block 204 of the illustrated embodiment of flow 200, one or more system of multiple leg international shipment system 100 are configured for facilitating shipping in accordance with the shipper's selections and information. Operation to configure one or more system of multiple leg international shipment system 100 for facilitating the shipper's shipping transactions may comprise configuring functionality of systems for multiple leg international shipping operation that may not implicate itinerant processing. For example, logic of international shipment computer system 150 may provide information to one or more of the shipper's systems used for shipping transactions (e.g., shipper computer system 115) for controlling selection of the particular shipping service providers providing the ingestion leg and delivery leg shipping services, controlling selection of the particular shipping service to be provided by one or more of the shipping service providers, controlling selection of a particular international processing provider and/or particular international processing provider facility for use with respect to individual international shipments, generation of one or more label, manifest, declarations form, and/or other international shipment documentation, etc. Additionally or alternatively, logic of international shipment computer system 150 may provide information to one or more international processing provider systems (e.g., international processing provider computer systems 125a and 125c) for controlling aggregating a plurality of items from individual international shipments, enabling commercial customs clearance of the items in the destination country, generation of one or more label, manifest, declarations form, and/or other international shipment documentation, controlling selection of the particular shipping service provider the delivery leg shipping services, controlling selection of the particular shipping service to be provided by shipping service providers, etc.

In operation according to embodiments, one or more systems of multiple leg international shipment system 100 are configured for operation including implementation of itinerant processing for the shipper's shipping transactions at block 204 of flow 200 shown in FIG. 2. Logic of international shipment computer system 150 may, for example, provide information to one or more of the shipper's systems used for shipping transactions (e.g., shipper computer system 115) and/or one or more international processing provider systems (e.g., international processing provider computer systems 125a and 125c) for implementing itinerant processing. In operation according to embodiments, such information may configure the shipper's systems to process appropriate ones of the shipping transactions (e.g., international shipping transactions for which itinerant processing is applicable) and initiate shipment of the item (e.g., initiate an ingestion leg shipment from the shipper's location), although one or more process for which itinerant processing is to be performed has not been initiated and/or completed. The shipper's systems may further be configured for processing to perform activity (e.g., soliciting international fee prepayment, performing an international fee prepayment transaction, soliciting and/or accepting changes from a shipper and/or recipient, performing fraud analysis, etc.) with respect to shipments for which itinerant processing is implement during the time in which the items are transported from a shipper to an international processing provider or other origination country egress processing point using the aforementioned information. Additionally or alternatively, such information may configure the international processing provider systems to process the appropriate ones of the shipping transactions in accordance with the applicable itinerate processes. For example, international processing provider computer systems 125a and 125c may be configured to monitor for particular activity (e.g., prepayment of international fees, a shipper and/or recipient making changes, fraud detected, etc.) with respect to shipments for which itinerant processing is implement during the time in which the items are transported from a shipper to an international processing provider or other origination country egress processing point, and to take appropriate action (e.g., cancel or abort the international shipment, initiate a return shipment to return items to the shipper, convert the shipment to payment of international fees upon delivery, making appropriate changes with respect to shipping labels and/or documentation to be associated with the items at the international processing provider location, selecting shipping service providers and/or shipping services based upon the monitored activity, etc.).

It should be appreciated that the systems in addition to or in the alternative to shipper computer systems and international processing provider computer systems of the foregoing examples may be configured for operation including implementation of itinerant processing for the shipper's shipping transactions at block 204 of embodiments. For example, recipient computer systems (e.g., recipient computer system 135), transaction processing systems (e.g., sales transaction computer system 140), shipment management and control systems (e.g. international shipment computer system 150, ancillary services systems (e.g., additional services computer system 160), etc., may be configured for implementing functionality in association with itinerant processing according to embodiments herein. As a specific example, logic of international shipment computer system 150 may provide information to one or more of the recipients' systems used for shipping transactions (e.g., recipient computer system 135) to configure the systems for processing to perform activity (e.g., performing an international fee prepayment transaction, soliciting and/or accepting changes from a recipient, etc.) with respect to shipments for which itinerant processing is implement during the time in which the items are transported from a shipper to an international processing provider or other origination country egress processing point.

Having described operation according to embodiments of flow 200 of FIG. 2 for configuration of multiple leg international shipment system 100 with respect to a shipper's international shipping transactions, attention is directed to FIG. 3 wherein flow 300 provides exemplary operation of multiple leg international shipment system 100, including implementing itinerant processing, in accordance with embodiments herein. At block 301 of the illustrated embodiment of flow 300, the shipper and/or requester request international shipping of an item. For example, the seller may have listed one or more items for sale using shipper computer system 115 and sales transaction computer system 140 and the recipient may have purchased an item using recipient computer system 135, whereby the item is to be shipped internationally (e.g., the shipper and recipient are disposed in different countries).

Various international fees (e.g., duties, tariffs, taxes, and/or other official fees associated with international transfer of goods) may be applicable to the international shipment of the item. Accordingly, operation of flow 300 of the embodiment illustrated in FIG. 3 includes international fee processing implemented at block 302. For example, shipper computer system 115, sales transaction computer system 140, and/or international shipment computer system 150 may operate to determine applicable international fees, to solicit and/or collect international fees from the recipient (e.g., using recipient computer system 135), etc. It should be appreciated that a number of alternatives may be implemented with respect to processes for the payment of international fees. Embodiments of the invention may provide a plurality of options with respect to processes for the payment of international fees, such as including a static prepay process (e.g., collecting prepayment of international fees prior to initiating shipment of the item) option, a payment on delivery process (e.g., using a postally cleared service to collect international fees upon delivery of the item to the recipient) option, and an itinerant prepay process (e.g., collecting prepayment of the international fees during pre-origination country egress shipment, such as during an ingestion leg, prior to a bridge leg, prior to completion of a bridge leg, prior to shipment involving international border crossing, prior to release for shipment into a jurisdiction in which international fees become due, etc.) option for payment of international fees. Accordingly, operation at block 302 of embodiments performs appropriate international fee processing, such as according to the appropriate or applicable process, a seller selection of the process, etc. For example, the particular process implemented for international fee collection may be based upon the process being the only available or enabled process, the process selected for use with respect to the shipper when the multiple leg international shipment system, a process determined to be applicable with respect to the particular recipient, particular class or category of recipient, particular destination country or geographic area, particular item or class of item, the transaction involving a minimum or maximum threshold value, particular origination country or geographic area, etc.

Where a static prepay process for international fee collection is implemented, processing at block 302 may, for example, operate to withhold initiating shipment of the item from the shipper's location until the international fees are prepaid. Accordingly, shipper computer system 115, sales transaction computer system 140, and/or international shipment computer system 150 may operate to solicit and collect prepayment of applicable international fees for international shipment of the item prior to permitting processing to proceed to ingestion leg shipment of the item. In operation of such a static prepay process, international shipment computer system 150 may interface with sales transaction computer system 140 to add an international fee entry into an ecommerce shopping cart in association with the item purchase transaction. Alternatively, international shipment computer system 150 may utilize a user interface to interface with a recipient (e.g., recipient computer system 135) to perform an international fee payment transaction for the item. In operation according to a static prepay process for international fee collection of embodiments, the international shipment of the item may be cancelled or aborted if prepayment is not received. Alternatively, embodiments may implement a convertible static prepay process in which collection of the international fees is converted (e.g., after some threshold period of time without receiving prepayment) from prepayment processing to an alternative form of international fee processing (e.g., payment on delivery where COD payment of international fees is made upon delivery of the item to the recipient using a postally cleared service is implemented).

Where a payment on delivery process for international fee collection is implemented, processing at block 302 may comprise identifying particular international processing providers and/or delivery leg shipping service providers accommodating a postally cleared service or similar payment on delivery service to obtain customs clearance. Such information may be used in later processing with respect to the international shipment of the item, such as to provide for selection of appropriate service providers and/or shipping services with respect to one or more legs of a multiple leg international shipment.

Where an itinerant prepay process for international fee collection is implemented, processing at block 302 may comprise provisioning one or more system for performing itinerant prepay processing. For example, international shipment computer system 150 may interface with shipper computer system 115 and/or sales transaction computer system 140 to provide information regarding an international fee amount, instructions regarding collecting international fees, etc. to facilitate collection of appropriate international fees for the item from a recipient during pre-origination country egress shipment (e.g., during an ingestion leg and/or a bridge leg, or some portion thereof, of the international shipment). Moreover, international shipment computer system 150 may provide control with respect to one or more systems (e.g., shipper computer system 115, international processing provider computer system 125, sales transaction computer system 140, etc.) of multiple leg international shipment system 100 to facilitate or enable initiating shipment of the item from the shipper's location despite the international fees remaining unpaid.

Operation at block 302 provides processing for facilitating multiple leg international shipment of the item according to embodiments. For example, in accordance with the illustrated embodiment, one or more shipping service provider, shipping service, international processing provider, and/or international processing provider facility are determined for providing the requested international shipping. It should be appreciated that the international shipment of the item provided according to embodiments comprises multiple leg international shipment in accordance with the concepts herein, although the shipper and/or recipient may have merely requested international shipping (e.g., the shipper and/or recipient may, at least initially, be unaware of or ambivalent to the particular underlying multiple leg international shipment technique and instead simply be desirous of having the item transported safely and reliably in accordance with one or more shipping parameters, such as transit time, cost, special handling, etc.).

In determining the one or more shipping service provider, shipping service, international processing provider, and/or international processing provider facility for providing the requested international shipping, logic of international shipment computer system 150 may analyze information regarding the item to be shipped, international shipment information associated with the item, information regarding the shipper, information regarding the recipient, information regarding shipping service providers, information regarding the shipping services and special handling requested by the shipper/recipient, information regarding international shipping service providers, and/or the like. Logic of international shipment computer system 150 of embodiments may analyze shipper information, such as shipper address, shipper country, shipper type (e.g., high volume shipper, low volume shipper, sophisticated international shipper, unsophisticated international shipper, company, individual, etc.), shipper history, etc., recipient information, such as recipient address, recipient country, recipient type (e.g., high volume recipient, low volume recipient, sophisticated international recipient, unsophisticated international recipient, company, individual, etc.), recipient history, etc., shipping services information, such as shipping services requested, special handling instructions, shipment stream ingestion characteristics (e.g., an item of a bulk item shipment, a single item shipment, delivery by shipper to shipping service provider depot, pickup at a shipper location, loading dock pickup, non-loading dock pickup, etc.), shipment stream termination characteristics (e.g., an item of a bulk item delivery, a single item delivery, recipient will call at a shipping service provider depot, delivery to a recipient location, loading dock delivery, non-loading dock delivery, etc.), preferences regarding shipping service providers, etc., item information, such as item physical attributes (e.g., size, weight, unusual or non-standard dimension(s), etc.), special handling requirements (e.g., hazardous materials, perishable materials, fragile contents, live animal/organism, etc.), and/or the like. Logic of international shipment computer system 150 may further analyze information regarding the international fee processing implemented with respect to the item for use in determining the one or more shipping service provider, shipping service, international processing provider, and/or international processing provider facility for providing the requested international shipping.

Using any or all the foregoing information, international shipment computer system 150 may determine the particular shipping service provider(s) and/or shipping service(s) providing the ingestion leg and/or delivery leg shipping services for the multiple leg international shipment of the item. For example, a shipping service provider providing the ingestion leg and/or delivery leg shipping services may be determined from a plurality of shipping service providers within an origination country and/or within a destination country based upon their providing lowest or most desired rates, providing desired shipping services or shipping services compatible with services requested by the shipper/recipient, providing one or more special services or handling, able to facilitate a desired delivery timeline, able to meet a desired or threshold level of reliability or veracity with respect to the particular services, able to facilitate collection of international fees, etc. Using such information, logic of international shipment computer system 150 may determine a best or otherwise suitable shipping service provider in the origination country to provide shipping services for the ingestion leg of a multiple leg international shipment and/or a best or otherwise suitable shipping service provider in the destination country to provide shipping services for the delivery leg of the multiple leg international shipment. Additionally, shipping service(s) used with respect to the ingestion leg and/or delivery leg may be determined from a plurality of shipping services offered by one or more of the shipping service providers of the plurality of shipping service providers based upon the shipping services requested by the shipper/recipient, shipping services compatible with services requested by the shipper/recipient, shipping services meeting all or many (e.g., most) criteria of the international shipment requested by the shipper/recipient, shipping services suitable for handling contents of the item to be shipped, etc. Accordingly, particular shipping service provider(s) and/or particular shipping service(s) to be provided by the shipping service provider(s) for meeting one or more needs or desires with respect to individual international shipment are determined in accordance with the illustrated embodiment of flow 300.

Further, using any or all the foregoing information, international shipment computer system 150 may determine the particular international processing provider(s) and/or international processing provider facility/facilities providing bridge leg shipping services for the multiple leg international shipment of the item. For example, an international processing provider providing the bridge leg shipping services may be determined from a plurality of international processing providers based upon based upon the international processing provider serving the origination and/or destination country, providing customs clearance processing or other international processing services with respect to particular type of goods included in the shipped item, providing selected or desired services (e.g., DDP service, expedited international processing services, etc.), providing processing to accommodate itinerate changes activities, one or more characteristic of the shipper (e.g., the sophistication of the shipper with respect to international shipping, the amount of international shipment items shipped by the shipper, etc.), one or more characteristic of the recipient (e.g., the sophistication of the recipient with respect to international shipping, the amount of international shipment items received by the shipper, etc.), one or more characteristic of the shipping service provider used in the ingestion leg and/or delivery leg (e.g., ability to accept shipment from shipping service provider, provide shipments to shipping service provider, existing cooperative data and/or logistics infrastructure, etc.), and/or the like. Additionally, selection of a particular international processing provider facility may, for example, be based upon the international processing provider facility's proximity to the shipper, the recipient, the origination country, and/or the destination country, the international processing provider facility's capability for handling a particular type of goods included in the shipped item, one or more characteristic of the shipping service provider used in the ingestion leg and/or delivery leg (e.g., physical infrastructure for accepting shipment from shipping service provider, providing shipments to shipping service provider, proximity to shipping service provider facilities, etc.), and/or the like.

As an example, the international processing provider or international processing provider facility with respect to the origination country may be selected so as to provide the shortest or most expedited route from the item ingestion point (e.g., shipper location) to the international processing provider facility. Additionally or alternatively, the international processing provider or international processing provider facility with respect to the origination country may be selected so as to provide a shortest or most efficient route to the destination country. Further, the international processing provider or international processing provider facility with respect to the origination country may be selected so as to accommodate the shipper, such as for a shipper shipping a large number of items, to provide services requested or needed by the shipper, etc. Similarly, the international processing provider or international processing provider facility with respect to the destination country may be selected so as to provide the shortest or most expedited route from the international processing facility to the delivery point (e.g., recipient location). Additionally or alternatively, the international processing provider or international processing provider facility with respect to the destination country may be selected so as to provide a shortest or most efficient route from the origination country. Further, the international processing provider or international processing provider facility with respect to the destination country may be selected so as to accommodate the shipper and/or recipient, such to provide services requested or needed by the shipper and/or recipient, etc. Accordingly, particular international processing provider(s) and/or particular international processing provider facility/facilities for meeting one or more needs or desires with respect to individual international shipment are determined in accordance with the illustrated embodiment of flow 300.

In operation of flow 300 at block 303 of embodiments, the particular shipping service provider(s), the particular shipping service(s), the particular international processing provider(s), and/or the particular international processing provider facility/facilities for a multiple leg international shipment may each be individually selected. However, it should be appreciated that although any or all of the foregoing may be individually selected, the determination for their selection may not be independent, or wholly independent, of one another. For example, selection of a particular shipping service provider, whether for the ingestion leg or delivery leg, may be based at least in part upon the shipping service provider offering shipping services meeting a selected shipping service for the multiple leg international shipment. Similarly, selection of a particular international processing provider may be based at least in part upon a selected shipping service provider for the multiple leg international shipment.

The embodiment of flow 300 illustrated in FIG. 3 shows the determinations with respect to the one or more shipping service provider, shipping service, international processing provider, and/or international processing provider facility being performed cooperatively in block 303. It should be appreciated, however, that embodiments of the invention may operate to independently and individually selected one or more shipping service provider, shipping service, international processing provider, and/or international processing provider facility (e.g., one or more determination of block 303 may be performed in separate blocks of an alternative flow 300). Moreover, determinations with respect to the one or more shipping service provider, shipping service, international processing provider, and/or international processing provider facility may be changed or revised (e.g., one or more determination of block 303 may be revised or changed in a subsequent block of flow 300), such as based upon itinerate activity or changes. For example, embodiments of the invention provide itinerant change processing operable to facilitate a shipper and/or recipient making changes, such as to change a delivery address, add, change, or remove special service selections (e.g., insurance for one or more legs of the shipment, shipment tracking, expedited delivery, delivery notification, signature requirement, etc.) and thus determinations regarding a shipping service provider, shipping service, international processing provider, and/or international processing provider facility may be changed or revised accordingly. Further, a particular shipping service provider and/or the particular shipping service to be provided by the shipping service provider initially selected with respect to a delivery leg of an international shipment may be changed in operation of a convertible itinerant prepay process.

At block 304 of flow 300 illustrated in FIG. 3, a shipping label for use in the ingestion leg of the multiple leg international shipment is generated and/or printed in preparation for initiating ingestion leg shipment of the item. For example, shipper computer system 115 at shipper location 110 may be used to print shipping label 111 used by the shipping service provider selected for the ingestion leg of the multiple leg international shipment. The ingestion leg shipping label of embodiments provides the appropriate shipping label for routing the item being shipped to the selected international processing provider by the shipping service provider selected for the ingestion leg.

Preparation for initiating ingestion leg shipment of the item may comprise processing in addition to or in the alternative to the above described processing. For example, a unified tracking number, as may be used in providing tracking information for the shipped item during the multiple leg international shipment, may be assigned for use with respect to the multiple leg international shipment. Accordingly, international shipment computer system 150 may generate the unified tracking number and assign that unified tracking number to the multiple leg international shipment for the item being shipped. Such a unified tracking number may be provided to the shipper and/or recipient (e.g., via shipper computer system 115 and/or recipient computer system 135) for their use in tracking the item throughout the multiple leg international shipment. Assignment of a unified tracking number may occur prior to or during operation to determine one or more shipping service provider, shipping service, international processing provider, and/or international processing provider facility for providing the requested international shipping. Alternatively, assignment of a unified tracking number may occur after generation and/or printing of any or all shipping labels and/or international documentation utilized for the multiple leg international shipment. When a tracking number for the ingestion leg of the multiple leg international shipment is assigned or available by the shipping service provider selected for the ingestion leg of the international shipment, that tracking number may be associated with the unified tracking number (e.g., in a database maintained by international shipment computer system 150) for use in obtaining tracking information for the item with respect to the ingestion leg. Likewise, when a tracking number for the delivery leg of the multiple leg international shipment is assigned or available by the shipping service provider selected for the delivery leg of the international shipment, that tracking number may also be associated with the unified tracking number for use in obtaining tracking information for the item with respect to the delivery leg. Similarly, tracking number information for the bridge leg of the multiple leg international shipment (where a tracking number is available with respect to the bridge leg) and/or status information regarding handling of the item by the international processing provider(s) is associated with the unified tracking number of use in obtaining tracking information for the item with respect to the bridge leg.

At block 305 of flow 300 illustrated in FIG. 3, multiple leg international shipment of the item is commenced by initiating ingestion leg shipping of the item whereby the item may be transported from a shipper location to an international processing provider facility location. For example, the ingestion leg shipping label may be applied to the item or otherwise associated with the item and the item provided to a shipping service provider selected for the ingestion leg of the shipment for providing shipping services to deliver the item to a facility of the international processing provider selected for the multiple leg international shipment. It should be appreciated that transit time for transporting the item from the shipper location to the international processing provider facility location may require an appreciable amount of time (e.g., several days to a week or more). Accordingly, embodiments of the invention operate to leverage this pre-origination country egress shipment time to perform processing with respect to the international shipment of the item. For example, embodiments of the invention provide itinerant processing such as may comprise an itinerant prepay process in which international fees associated with items being shipped internationally may be collected prior to the items entering the jurisdiction (e.g., destination country) in which the international fees become due, itinerant change processing operable to facilitate a shipper and/or recipient making changes with respect to the international shipment after initiation of one or more leg of the multiple leg international shipment, and/or itinerant business procedure processing to perform business functionality relevant to the international shipment after initiation of one or more leg of the multiple leg international shipment.

To facilitate itinerant processing in accordance with concepts herein, the illustrated embodiment of flow 300 includes block 311 providing operation to initiate one or more itinerate process for providing itinerant processing during pre-origination country egress shipment of the item. It should be appreciated that, although the itinerate processes are illustrated as being initiated in parallel with operation at block 305 initiating ingestion leg shipping of an item, any or all itinerate processes implemented with respect to a particular item may be initiated at different points. For example, prepay itinerate processing may be initiated very early in the flow (e.g., in parallel with the international fee processing of bock 302, as shown by dashed block 311*a*), such as to perform one or more functions thereof in close temporal proximity to other functionality (e.g., item purchase transaction processing), to facilitate sufficient time to complete the itinerate processing (e.g., allow adequate time for collecting prepayment of international fees, etc.). Irrespective of the particular point at which itinerant processing may be initiated according to embodiments, one or more itinerate processes appropriate to the international shipment of the item may nevertheless be performed prior to the item departing an origination country egress processing point (e.g., as the item is transported from a shipper to an international processing provider or other origination country egress processing point, such as during the ingestion leg and/or some portion of a bridge leg).

Where itinerant prepay processing for international fee collection is implemented, processing at block 311 may, for example, operate to facilitate collection of appropriate international fees for the item. For example, international shipment computer system 150 may calculate applicable international fees, communicate with the recipient (e.g., using recipient computer system 135) for eliciting international fee payment, initiate an international fee payment transaction (e.g., using sales transaction computer system 140) with the recipient, etc. Accordingly, although calculation of the appropriate international fees and/or collecting payment for the international fees may take appreciable time (e.g., time in excess of a typical checkout procedure in a purchase transaction for the item), shipment of the item from a shipper location may be initiated where prepayment of international fees is to be collected despite payment for the international fees associated with the international shipment not having been made. In accordance with an itinerant prepayment process, prepayment of the international fees for an item may nevertheless be collected prior to the item entering the destination country. However, should international fee prepayment not be made prior to a critical point in the multiple leg international shipment, embodiments of an itinerant prepay process may initiate alternative action with respect to the international shipment, such as to implement corrective action (e.g., cancelling or aborting the international shipment) for return of the item to avoid its abandonment in a destination country, alter the international fee payment methodology to attempt to collect the payment upon delivery of the item, etc.

Where itinerant change processing for the international shipment is implemented, processing at block 311 may operate to facilitate a shipper and/or recipient making one or more changes with respect to international shipping of an item. For example, shipper computer system 115 and/or recipient computer system 135, perhaps operating in cooperation with international shipment computer system 150, may solicit and/or accept changes from a shipper and/or recipient regarding one or more aspect of an international shipment. Such changes may, for example, comprise changing a delivery address, adding, changing, or removing special service selections (e.g., insurance for one or more legs of the shipment, shipment tracking, expedited delivery, delivery notification, signature requirement, etc.), changing a shipping service provider and/or shipping service, etc.

Where itinerant business procedure processing for the international shipment is implemented, processing at block 311 may operate to perform business functionality relevant to the international shipment during one or more leg of the multiple leg international shipment. For example, shipper computer system 115 and/or international shipment computer system 150 may implement an itinerant fraud detection process (e.g., analyzing payment data, such as records associated with a credit card used for payment, to identify a fraudulent transaction, analyzing shipment origination and/or destination information to identify historical fraud, etc.) for identifying fraud in association with the shipping transaction (e.g., a fraudulent purchase transaction). The particular business processing implemented in an itinerant business procedure process may, for example, be important or even critical to one or more parties to the transaction, but nevertheless consume appreciable time to complete. Accordingly, the business processing may not be well suited for implementing in a static process, wherein initiation of shipment of the item withheld until completion of the business processing. However, in accordance with an itinerant business procedure process, such as the foregoing exemplary itinerant fraud detection process, even a complicated and thorough business process may be implemented and completed prior to a point in the multiple leg international shipment at which corrective action (e.g., cancelling or aborting the international shipment) may be taken.

In operation according to the itinerant processing path of flow 300 illustrated in FIG. 3, one or more systems of multiple leg international shipment system 100 monitor for itinerate activity during the time in which an item to be shipped internationally is transported from a shipper to an international processing provider or other origination country egress processing point to collect information regarding itinerant processing with respect to the item. For example, international processing provider computer systems 125*a* and 125*c* may monitor (e.g., through communication with one or more of shipper computer system 115, recipient computer system 135, sales transaction computer system 140, international shipment computer system 150, and/or additional services computer systems 160) for itinerant processing activity (e.g., prepayment of international fees, a shipper and/or recipient making changes, fraud detection, etc.) with respect to the item if itinerant processing is implemented with respect to the item. Where itinerant processing activity is detected during pre-origination country egress shipment data regarding the itinerant activity (e.g., international fee payment information, information regarding particular changes requested by a shipper and/or recipient, fraud alert information, etc.) is provided (e.g., as itinerate activity data 321) for initiating action with respect to the international shipment of the item as appropriate.

At block 306 of the illustrated embodiment of flow 300, international processing is provided by the international processing provider in a bridge leg of the international shipment with respect to the item being shipped internationally. For example, the item may have been delivered to an international processing provider facility location (e.g., international processing provider facility location 120*a*) at the conclusion of an ingestion leg of the international shipment for further international shipment processing. The international processing provided in operation of block 306 of embodiments may, for example, comprise processing to facilitate international border passage, including international transportation and/or customs logistics. Such international processing provided by the international processing provider in a bridge leg of the international shipment may additionally or alternatively include customs processing, international fee settlement, and/or the like. It should be appreciated that the item being provided international shipment may be transported, as part of a bridge leg of the international shipment, from an international processing provider facility or other origination country egress processing point (e.g., international processing provider facility location 120*a* or 120*b*) to an international processing provider facility or other ingress processing point in the destination country (e.g., international processing provider facility location 120*c* or 120*d*) for further international processing, such as for customs clearance, etc., in the destination country.

In operation according to embodiments, activity with respect to one or more itinerate process (e.g., activity associated with an itinerate process initiated at block 311) may have taken place during the time in which the items are transported from a shipper to an international processing provider or other origination country egress processing point (e.g., as may have been detected in operation of block 312). Accordingly, international processing provided by the international processing provider with respect to the item at block 306 of embodiments may include operation to take appropriate action (e.g., cancel or abort the international shipment, initiate a return shipment to return items to the shipper, convert the shipment to payment of international fees upon delivery, making appropriate changes with respect to shipping labels and/or documentation to be associated with the items at the international processing provider location, selecting shipping service providers and/or shipping services based upon the monitored activity, etc.) based upon itinerate activity. For example, international processing provider computer system 125*a* may monitor for collection of the appropriate international fees and may implement or allow further international processing (e.g., customs processing, international fee settlement using a commercially cleared service, etc.) and international border passage (e.g., international transportation, customs logistics, etc.) for the item where payment of the international fees is timely collected from the recipient in an itinerant prepay process. However, international processing provider computer system 125*a* may prevent further international processing and international border passage for the item where payment of the international fees is not timely collected from the recipient in an itinerant prepay process, such as by causing the item to be returned to the shipper for want of international fee payment. Alternatively, international processing provider computer system 125*a* may provide operation to facilitate international shipment of the item by implementing a convertible itinerant prepay process in which collection of the international fees is converted from prepayment processing to static prepay or payment on delivery.

Operation at block 306 of embodiments of flow 300 may include generation and/or printing of international documentation for use in the bridge leg of the multiple leg international shipment is generated and/or printed. For example, international processing provider computer system 125*a* at international processing provider location 120*a* may be used to print international documentation used by the international processing provider, export control agents in the origination country, import control agents in the destination country, customs agents, etc. for the bridge leg of the multiple leg international shipment. Further, operation at block 306 of embodiments may include generation and/or printing of one or more shipping labels used in the international shipment of the item. For example, international processing provider computer system 125*a* at international processing provider location 120*a* or international processing provider computer system 125*c* at international processing provider location 120*c* may be used to print shipping label 121 used by the shipping service provider selected for the delivery leg of the multiple leg international shipment. Alternatively, shipper computer system 115 at shipper location 110 may be used to print shipping label 121 used by the shipping service provider selected for the delivery leg of the multiple leg international shipment.

The bridge leg international documentation of embodiments provides the appropriate documentation for international processing and/or international transport of the item being shipped for the bridge leg and the delivery leg shipping label provides the appropriate documentation for facilitating delivery of the item to a recipient within the destination country. Accordingly, the international processing provided at block 306 of embodiments may include selecting or reselecting a particular shipping service provider and/or the particular shipping service to be provided by the shipping service provider with respect to a delivery leg of an international shipment based upon itinerate activity data for the item. Moreover, the international processing provided at block 306 of flow 300 may include implementing one or more changes or other actions based upon itinerant change processing and/or itinerant business procedure processing provided during pre-origination country egress shipment with respect to the item. For example, information within shipping label 121 and/or international documentation 122, such as a delivery address, special service selections (e.g., insurance for one or more legs of the shipment, shipment tracking, expedited delivery, delivery notification, signature requirement, etc.), return address, etc. may be changed, added, and/or revised according to embodiments of the invention.

Accordingly, in operation according to embodiments, international processing provider computer system 125*a*, international processing provider computer system 125*c* and/or international shipment computer system 150 may generate and/or print shipping label 121 and/or international documentation 122 with various changes and/or information based upon results of itinerant prepay processing performed during pre-origination country egress shipment. For example, a particular shipping service provider and/or the particular shipping service to be provided by the shipping service provider initially selected with respect to a delivery leg of an international shipment may be changed in operation of a convertible itinerant prepay process, such as when payment of the international fees is not collected from the recipient during pre-origination country egress shipment. Information within shipping label 121 and/or international documentation 122 may thus be changed or otherwise provided for routing item 101 from the international processing provider to the recipient using a shipping service provider selected for the destination country that provides an alternative form of international fee processing (e.g., payment on delivery where COD payment of international fees is made upon delivery of the item to the recipient using a postally cleared service is implemented) to facilitate the international shipment.

Where the delivery leg shipping service is changed to provide for payment on delivery (e.g., using a postally cleared shipping service), not only may changes be made in order to produce a shipping label acceptable to the particular shipping service provider and/or shipping service (e.g., USPS shipping label including valid postage indicia) but other changes may be made, such as to optimize the use of the shipping service, to take advantage of features of the shipping service, etc. For example, rather than using a return address to obscure the international origin of the shipment, the shipper's address within the origination country may be utilized in order to facilitate return shipping of the item to the shipper if payment on delivery of the item to the recipient should fail (e.g., despite the initiation of the shipment using the shipping service provider and shipping service not having been the shipper's location, but instead may have been an international processing provider facility location). Accordingly, although the costs for customs processing and/or destination country delivery services may be appreciably higher using the shipping service provider and/or shipping service enabling payment of international fees on delivery of the item to the recipient, the risk of abandonment of the item due to failure of the recipient to pay international fees may be reduced and/or the associated cost of return shipping may be avoided.

It should be appreciated that generation of a shipping label or international documentation may be performed at a place that is different than the printing of the shipping label or international documentation. For example, where postage indicia is included in one or more of the shipping labels (e.g., a shipper's or recipient's postage meter account is utilized for generating prepaid value bearing indicia), the shipping label may be generated using a system having access to an account (e.g., postal account or postage value sorted in a postage security device) for the postage indicia. In operation of an exemplary embodiment, wherein the shipper provides an account utilized with respect to one or more leg of the multiple leg international shipment, one or more shipping label may be generated by shipper computer system 115, although the shipping label is printed by international processing provider computer system 125*a* or international processing provider computer system 125*c*. In operation of another exemplary embodiment, wherein the recipient provides an account utilized with respect to one or more leg of the multiple leg international shipment, one or more shipping label may be generated by recipient computer system 135, although the shipping label is printed by shipper computer system 115, international processing provider computer system 125*a*, or international processing provider computer system 125*c*. In accordance with yet another exemplary embodiment, international processing provider computer system 125*a* may be utilized to generate some or all of the international documentation utilized with respect to the multiple leg international shipment, whereas international processing provider computer system 125*c* may be utilized to print at least some portion of the international documentation.

At block 308 illustrated in FIG. 3, multiple leg international shipment of the item may be accomplished by initiating delivery leg shipping of the item whereby the item may be transported from an international processing provider facility location to the recipient location. For example, the delivery leg shipping label may be applied to the item or otherwise associated with the item and the item provided to a shipping service provider selected for the delivery leg of the shipment for providing shipping services to deliver the item to the recipient. Thus, item 101 may then be transported from the international processing provider or other ingress processing point in the destination country (e.g., international processing provider facility location 120*c* or 120*d*) to the recipient (e.g., at recipient location 130).

It should be appreciated that delivery leg shipping of a multiple leg shipment herein may not be initiated within the destination country according to embodiments. For example, where the delivery leg shipping is converted to provide for payment of international fees on delivery of the item to the recipient, the delivery leg may comprise the use of a shipping service provider of the origination country (or some country in the multiple leg shipment prior to ingress into the destination country) providing a postally cleared service. Accordingly, the delivery leg may be initiated by the international processing provider (e.g., at international processing provider facility location 120*a*) delivering the item to a shipping service provider (e.g., the USPS) outside of the destination country.

Although embodiments implementing itinerant processing in accordance with concepts herein have been discussed above with reference to international shipping, it should be appreciated that itinerant processing may be implemented with respect to other shipping scenarios. For example, itinerant processing (e.g., itinerant change processing, itinerant business procedure processing, etc.) may be implemented with respect to domestic shipping of items where multiple leg shipping is used, such as to provide consolidation of shipped items for long haul shipping, cross country shipping, inter zone shipping, etc. Accordingly, embodiments implementing itinerant processing enable a shipper or other party interested in a shipment to intervene while an item is in shipment.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An international shipment computer system for providing international shipment processing facilitating multiple leg international shipment of items, the system comprising:
   a processor; and
   a memory in communication with the processor, wherein the memory stores one or more instruction sets which when executed by the processor cause the processor to:

determine that a shipper has selected that an itinerant processing be implemented with respect to at least one international shipping transaction via a shipper computer system, wherein the at least one international shipping transaction comprises a multiple leg international shipment of an item to be shipped by the shipper;

assign a unified tracking number to the multiple leg international shipment of the item to be stored in a database;

control a first shipping service provider computer system to facilitate initiating shipment of the item from a shipper location despite international fees for the item remaining unpaid;

facilitate an initiation of an ingestion leg of the multiple leg international shipment of the item although at least one process for which the itinerant processing is performed for the at least one international shipping transaction has not been completed, wherein the at least one process for the itinerant processing comprises collecting the international fees for the at least one international shipping transaction, and wherein a first tracking number is assigned for the ingestion leg and associated with the unified tracking number to store first tracking information for the item in an international processing provider computer system;

obtain data of an itinerant activity with respect to the multiple leg international shipment of the item during a pre-origination country egress shipment of the item, wherein the data comprises payment information pertaining to the international fees made by the shipper;

initiate at least one change to the multiple leg international shipment of the item appropriate to the itinerant activity based upon the data of the itinerant activity with respect to the multiple leg international shipment of the item, wherein the at least one change comprises transmitting the data of the itinerant activity electronically to the international processing provider computer system over a network prior to an arrival of the item at a facility of the international processing provider computer system to allow a printer of the international processing provider computer system to print a shipping label for a destination country with the data in a domestic shipping label configuration that removes international shipping information associated with the item, wherein the domestic shipping label configuration has a second tracking number and is associated with the unified tracking number to store second tracking information for the item; and manipulate tracking information associated with the unified tracking number based on at least one of: the first tracking number or the second tracking number that corresponds to and is accurate for domestic shipment of the item reported for a respective individual shipment leg of the multiple leg international shipment, and wherein the tracking information associated with the unified tracking number is manipulated to be accurate for the multiple leg international shipment, wherein the international processing provider computer system is configured by the international shipment computer system to monitor for a particular activity with respect to the multiple leg international shipment of the item during the pre-origination country egress shipment of the item and to take an action based on the particular activity, and wherein the action taken based on the particular activity includes an action selected from a group consisting at least one of: converting the multiple leg international shipment to payment of the international fees upon delivery.

2. The international shipment computer system of claim 1, wherein the one or more instruction sets cause the processor to:
implement the itinerant processing for the multiple leg international shipment of the item during the pre-origination country egress shipment of the item.

3. The international shipment computer system of claim 1, wherein the one or more instruction sets cause the processor to:
analyze information provided by the shipper to determine a subset of shipping transactions to which the at least one process is to apply for enabling the itinerant processing appropriate for the shipper.

4. The international shipment computer system of claim 1, wherein the one or more instruction sets causing the processor to:
analyze information provided by the shipper to determine one or more systems, service providers, or services suitable for facilitating functions of the itinerant processing selected by the shipper.

5. The international shipment computer system of claim 1, wherein the one or more instruction sets causing the processor to:
provide information to one or more systems used by the shipper for shipping transactions or one or more international processing provider systems for implementing the itinerant processing.

6. The international shipment computer system of claim 1, wherein the particular activity includes an activity selected from a group consisting of:
prepayment of the international fees for the item; and
detecting fraud with respect to the multiple leg international shipment of the item.

7. The international shipment computer system of claim 1, wherein the group further consisting of:
cancelling the multiple leg international shipment of the item; and
initiating a return shipment to return the item to the shipper.

8. The international shipment computer system of claim 1, wherein the one or more instruction sets cause the processor to: interact with an intended recipient system of the item, and wherein the intended recipient system is configured to perform an activity with respect to the multiple leg international shipment of the item during the pre-origination country egress shipment of the item.

9. The international shipment computer system of claim 8, wherein the activity includes performing an international fee prepayment transaction of the international fees.

10. The international shipment computer system of claim 1, wherein the itinerant processing includes itinerant prepay processing to initiate an international fee payment transaction of the international fees, and wherein the one or more instruction sets causing the processor to initiate the at least one change to the multiple leg international shipment further cause the processor to:
alter the international fee payment transaction of the international fees from a prepayment processing to: a static prepay or a payment on delivery.

11. The international shipment computer system of claim 1, wherein the itinerant processing includes itinerant fraud detection processing to identify fraud in association with the multiple leg international shipment, and wherein the one or more instruction sets causing the processor to initiate the at least one change to the multiple leg international shipment further cause the processor to:
  alter shipment of the item from the multiple leg international shipment of the item to a return shipment to return the item to the shipper.

12. A method implemented by an international shipment computer system for facilitating multiple leg international shipment of items, the method comprising:
  determining that a shipper has selected that an itinerant processing be implemented with respect to at least one international shipping transaction via a shipper computer system, wherein the at least one international shipping transaction comprises a multiple leg international shipment of an item to be shipped by the shipper;
  assigning a unified tracking number to the multiple leg international shipment of the item to be stored in a database;
  controlling a first shipping service provider computer system to facilitate initiating shipment of the item from a shipper location despite international fees for the item remaining unpaid;
  facilitating an initiation of an ingestion leg of the multiple leg international shipment of the item although at least one process for which the itinerant processing is performed for the at least one international shipping transaction has not been completed, wherein the at least one process for the itinerant processing comprises collecting the international fees for the at least one international shipping transaction, and wherein a first tracking number is assigned for the ingestion leg and associated with the unified tracking number to store first tracking information for the item in an international processing provider computer system;
  obtaining data of an itinerant activity with respect to the multiple leg international shipment of the item during a pre-origination country egress shipment of the item, wherein the data comprises payment information pertaining to the international fees made by the shipper;
  initiating at least one change to the multiple leg international shipment of the item appropriate to the itinerant activity based upon the data of the itinerant activity with respect to the multiple leg international shipment of the item, wherein the at least one change comprises transmitting the data of the itinerant activity electronically to the international processing provider computer system over a network prior to an arrival of the item at a facility of the international processing provider computer system to allow a printer of the international processing provider computer system to print a shipping label for a destination country with the data in a domestic shipping label configuration that removes international shipping information associated with the item, wherein the domestic shipping label configuration has a second tracking number and is associated with the unified tracking number to store second tracking information for the item
  manipulating tracking information associated with the unified tracking number based on at least one of: the first tracking number or the second tracking number that corresponds to and is accurate for domestic shipment of the item reported for a respective individual shipment leg of the multiple leg international shipment, and wherein the tracking information associated with the unified tracking number is manipulated to be accurate for the multiple leg international shipment; and
  configuring the international processing provider computer system to monitor for a particular activity with respect to the multiple leg international shipment of the item during the pre-origination country egress shipment of the item and to take an action based on the particular activity, wherein the action taken based on the particular activity includes an action selected from a group consisting at least one of: converting the multiple leg international shipment to payment of the international fees upon delivery.

13. The method of claim 12, further comprising:
implementing the itinerant processing for the multiple leg international shipment of the item during the pre-origination country egress shipment of the item.

14. The method of claim 12, further comprising:
analyzing information provided by the shipper to determine a subset of shipping transactions to which the at least one process is to apply for enabling the itinerant processing appropriate for the shipper.

15. The method of claim 12, further comprising:
analyzing information provided by the shipper to determine one or more systems, service providers, or services suitable for facilitating functions of the itinerant processing selected by the shipper.

16. The method of claim 12, further comprising:
providing information to one or more systems used by the shipper for shipping transactions or one or more international processing provider systems for implementing the itinerant processing.

17. The method of claim 12, wherein the particular activity includes an activity selected from a group consisting of:
  prepayment of the international fees for the item; and
  detecting fraud with respect to the multiple leg international shipment of the item.

18. The method of claim 12, wherein the group further consisting of:
  cancelling the multiple leg international shipment of the item; and
  initiating a return shipment to return the item to the shipper.

19. The method of claim 12, further comprising: interacting with a system of an intended recipient of the item to perform an activity with respect to the multiple leg international shipment of the item during the pre-origination country egress shipment of the item.

20. The method of claim 12, wherein the itinerant processing includes an itinerant prepay processing to initiate an international fee payment transaction of the international fees, and wherein the initiating the at least one change to the multiple leg international shipment comprises:
  altering the international fee payment transaction of the international fees from a prepayment processing to: a static prepay or a payment on delivery.

21. The method of claim 12, wherein the itinerant processing includes itinerant fraud detection processing to identify fraud in association with the multiple leg international shipment, and wherein the initiating the at least one change to the multiple leg international shipment comprises:
  altering shipment of the item from the multiple leg international shipment of the item to a return shipment to return the item to the shipper.

22. The method of claim 19, wherein the activity includes performing an international fee prepayment transaction of the international fees.

\* \* \* \* \*